US011614050B2

(12) United States Patent
Montes et al.

(10) Patent No.: US 11,614,050 B2
(45) Date of Patent: Mar. 28, 2023

(54) TWO-DIMENSIONAL SUPERSONIC NOZZLE THRUST VECTORING USING STAGGERED RAMPS

(71) Applicant: THE REGENTS OF THE UNIVERSITY OF CALIFORNIA, Oakland, CA (US)

(72) Inventors: Carlos F. Montes, Sunnyvale, CA (US); Roger L. Davis, Sacramento, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 493 days.

(21) Appl. No.: 16/217,370

(22) Filed: Dec. 12, 2018

(65) Prior Publication Data
US 2019/0195169 A1 Jun. 27, 2019

Related U.S. Application Data

(63) Continuation of application No. PCT/US2017/037780, filed on Jun. 15, 2017.

(60) Provisional application No. 62/350,692, filed on Jun. 15, 2016.

(51) Int. Cl.
F02K 1/00 (2006.01)
F02K 1/12 (2006.01)

(52) U.S. Cl.
CPC ............ F02K 1/006 (2013.01); F02K 1/1207 (2013.01); F05D 2220/323 (2013.01); F05D 2220/80 (2013.01); F05D 2250/411 (2013.01); F05D 2250/52 (2013.01); F05D 2250/73 (2013.01)

(58) Field of Classification Search
CPC .............................. F02K 1/006; F02K 1/1207
See application file for complete search history.

(56) References Cited

U.S. PATENT DOCUMENTS

| 2,928,238 A | 3/1960 | Hawkins, Jr. |
| 3,038,304 A | 6/1962 | Alford |
| 3,057,150 A * | 10/1962 | Horgan ................ F02K 1/52 239/127.3 |
| 3,062,003 A | 11/1962 | Hamilton |
| 3,558,058 A | 1/1971 | Lennard |
| 3,605,939 A | 9/1971 | Duthion |
| 3,973,731 A | 8/1976 | Thayer |
| 4,000,610 A | 1/1977 | Nash |

(Continued)

FOREIGN PATENT DOCUMENTS

| EP | 1158156 A2 | 11/2001 |
| GB | 895331 A | 5/1962 |
| WO | 2017218841 A1 | 12/2017 |

OTHER PUBLICATIONS

NASA "Afterburning Turbojet" (Year: 2014).*

(Continued)

*Primary Examiner* — Arun Goyal
*Assistant Examiner* — William L Breazeal
(74) *Attorney, Agent, or Firm* — Park, Vaughan, Fleming & Dowler LLP

(57) ABSTRACT

A system and method for vectoring the thrust of a supersonic, air-breathing engine. A thrust vectoring mechanism uses two asymmetrically staggered ramps; one placed at the throat, the other positioned at the exit lip of the nozzle of the engine to re-direct exhaust flow off-axis with the nozzle.

21 Claims, 17 Drawing Sheets

(56) References Cited

U.S. PATENT DOCUMENTS

| | | | |
|---|---|---|---|
| 4,000,854 A | | 1/1977 | Konarski |
| 4,052,007 A | * | 10/1977 | Willard .................. F02K 1/006 |
| | | | 239/265.29 |
| 4,063,685 A | | 12/1977 | Jacobs |
| 4,280,660 A | | 7/1981 | Wooten, Jr. |
| 5,125,596 A | | 6/1992 | Cavalleri |
| 5,154,050 A | | 10/1992 | Herup |
| 6,112,512 A | | 9/2000 | Miller |
| 6,308,740 B1 | | 10/2001 | Smith |
| 6,962,044 B1 | | 11/2005 | Miller |
| 7,823,838 B1 | * | 11/2010 | Denning ................. B64C 15/02 |
| | | | 244/55 |
| 8,746,613 B2 | | 6/2014 | Suchezky |
| 2014/0145001 A1 | | 5/2014 | Winkler |

OTHER PUBLICATIONS

ISA/US, United States Patent and Trademark Office (USPTO), International Search Report and Written Opinion dated Aug. 29, 2017, related PCT international application No. PCT/US2017/03//80, pp. 1-8, claims searched, pp. 9-12.

Montes, Carlos F. et al., "Two-Dimensional Supersonic Thrust Vectoring Using Staggered Ramps", Journal of Engineering for Gas Turbines and Power, ASME, Aug. 2017, vol. 139, 082605-1 to 082605-11, published online Mar. 28, 2017.

* cited by examiner

TWO-DIMENSIONAL SUPERSONIC NOZZLE THRUST VECTORING USING STAGGERED RAMPS

CROSS-REFERENCE TO RELATED APPLICATIONS

This application claims priority to, and is a 35 U.S.C. § 111(a) continuation of, PCT international application number PCT/US2017/037780 filed on Jun. 15, 2017, incorporated herein by reference in its entirety, which claims priority to, and the benefit of, U.S. provisional patent application Ser. No. 62/350,692 filed on Jun. 15, 2016, incorporated herein by reference in its entirety. Priority is claimed to each of the foregoing applications.

The above-referenced PCT international application was published as PCT International Publication No. WO 2017/218841 A1 on Dec. 21, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to jet propulsion engines, and more particularly to jet propulsion engines with supersonic thrust vectoring.

2. Background Discussion

Since their creation in the late 1930s, jet engines have become widely used in the aviation industry. The military has made particular use of turbojet or mixed-flow turbofan engines to propel high-maneuverability aircraft at greater speeds than their commercial or transport counterparts. Considering the physics of compressible flow within a convergent (CV) or convergent-divergent (CV-DV) nozzle, an aircraft's thrust is typically purely axial.

Given the application of turbojet engines for military aircraft, the capability to vector the produced thrust became desirable. Thrust vector control (TVC) provides several advantages, such as increased maneuverability at low flight speeds and higher angles of attack. Providing an aircraft with TVC capabilities does have its additional costs, however.

A turbojet or turbofan engine is a heavy, complex piece of engineering on its own. Being able to redirect the exhaust flow calls for additional hardware or modifications, leading to penalties in additional engine weight, manufacturing, and maintenance. As such, several TVC methods have been previously developed, both mechanical and non-mechanical. The former has seen more implementations than the latter, due to the practicality in air-breathing engines.

Several mechanical approaches to vector an aircraft's thrust have been implemented with modern engines. One method is to swivel the diverging section of the nozzle. Such a system can incur heavy penalties in additional engine weight.

In lieu of swiveling the nozzle's entire DV section, smaller nozzles can be integrated on the engine. For example, a door can divert the core flow to these smaller, rotatable nozzles. This concept can be extended, in which a retractable vane can redirect the exiting nozzle flow (either with or without the smaller nozzles).

Other systems include using two flaps at the nozzle exit, which can redirect the flow in either the pitch or yaw direction.

In addition to the above mechanical TVC systems that use external thrust vectoring, there are also internal mechanisms (e.g. one or more flaps) placed at the nozzle wall, which can achieve the desired result.

BRIEF SUMMARY

An aspect of the present description is a system and method for vectoring the thrust of a supersonic, air-breathing engine. By way of example, and not of limitation, the mechanism uses two asymmetrically staggered ramps; one placed at the throat, the other positioned at the exit lip of the nozzle of the engine.

The nozzle was configured using published flow data, isentropic relationships, and piecewise quartic splines. The nozzle configurations were validated numerically and were found to agree with analytical data. Using the steady-state pressure-based solver, along with the realizable k-ε turbulence model, a total of eighteen simulations were conducted: three ramp lengths at three angles, using two sets of inlet boundary conditions (non-afterburning and afterburning).

The vectoring simulations showed that the afterburning flow yields a lower flow deflection distribution, shown by the calculated average deflection angle and area-weighted integrals of the distributions. The data implies that an aircraft can achieve an average thrust vectoring angle of approximately 30° in a given direction with the longest ramp length and largest ramp angle configuration. With increasing ramp angle, the static pressure across the nozzle inlet increased, causing concern for potential negative effects on the engine's turbine.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 10 is a plot showing y+ distribution along the nozzle wall associated with a wall spacing of $5 \times 10^{-4}$-in.

FIG. 15 shows an exemplary baseline grid with a lower cell count for visual clarity. In the actual grid, each cell had an approximate space of 0.125-in.

DETAILED DESCRIPTION

1. Thrust Vector Control Overview

Figure 1:
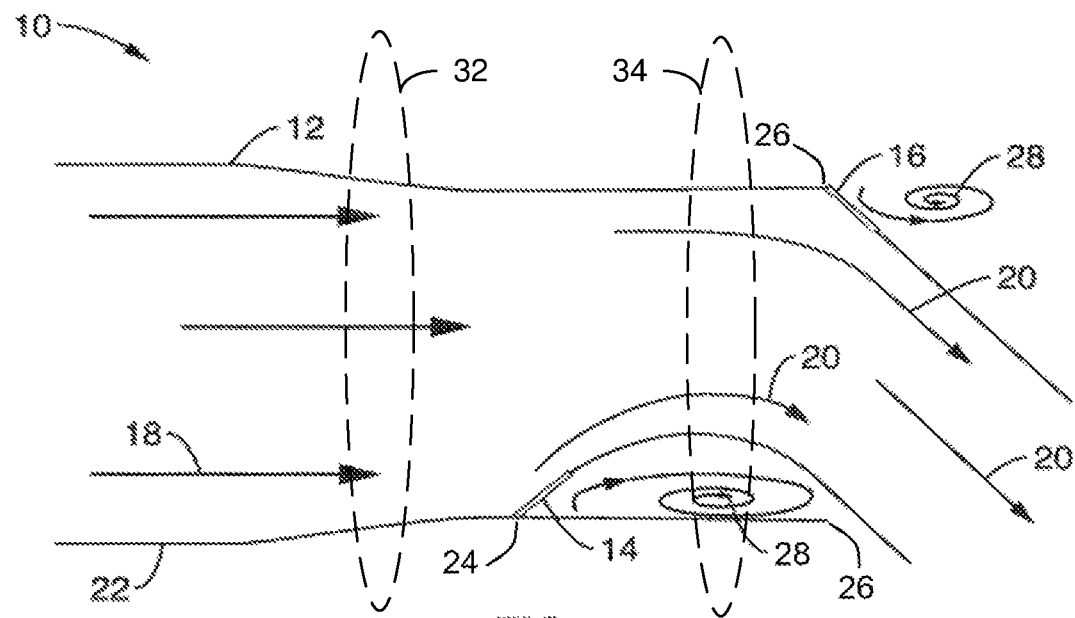
FIG. 1 is a side-view, schematic diagram of a nozzle configuration Thrust Vector Control (TVC) in accordance with the present description, showing an exemplary flow path with deployed ramps.

FIG. 1 shows a side-view, schematic diagram of a rectangular, CV-DV nozzle 10 configured for thrust vector control (TVC) of supersonic exit conditions typical of modern military aircraft. With published pressure and temperature data for the Pratt & Whitney F100-PW-100 engine (used on the F-15 and F-16 aircrafts), along with the compressible, isentropic relationships, the inlet, throat, and exit shape of the nozzle wall were determined. Nozzle 10 uses two deployable ramps in the nozzle, a first ramp (throat ramp) 14 at the throat 24 of the inner wall 22 of nozzle 10, and the second ramp (exit ramp) 16 at exit 26. Sonic line skewing is employed to redirect the exhaust flow 18 from purely axial flow at region 22 (un-deployed) to thrust-vectored (deployed) flow 20 at the exit 26.

As the throat ramp 14 causes the initial separation of airflow 18, the exit ramp 16 assists in redirecting the re-attaching flow 20 in a given direction. It is the presence of the second ramp that will skew the sonic line.

Given the variability of the ramps' angular position, however, one can also expect some flow separation 28 to occur at the upstream base of the ramps at extreme 8 values. Table A, Table B and Table C show defined nomenclature for variables, symbols and subscripts, respectively, used in the description below.

2. Nozzle Geometry

Figure 6:
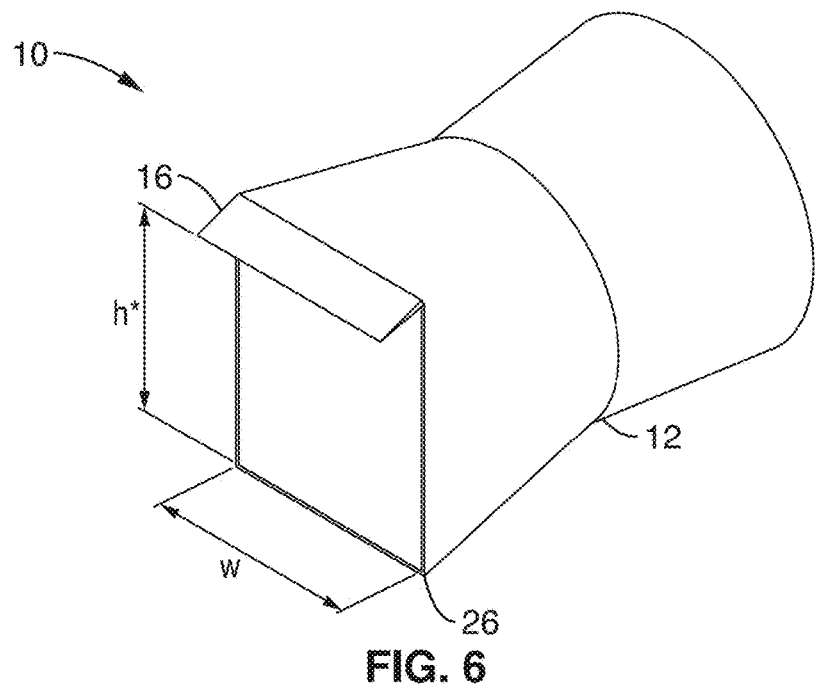
FIG. 6 shows a perspective view of a simplified 3D configuration of the nozzle of the present description.

In a preferred embodiment, the thrust vector control (TVC) mechanism described herein is configured as a convergent-divergent (CV-DV) nozzle fur use primarily for military applications with supersonic capabilities. While the nozzle 10 detailed in the present description is rectangular (see FIG. 6 illustrating nozzle wall 12 incorporating exit ramp 16 at rectangular exit 26), it is appreciated that the TVC mechanism may also be implemented in circular nozzles.

2.1 Design Parameters

Nozzle 10 cross-sectional areas at the inlet 22, throat 24, and exit 26 were first configured for the CV-DV configuration (e.g. converging section 32 from inlet 22 to throat 24, and diverging section 34 from throat 24 to exit 26). To obtain the area ratios (A/A*), three boundary conditions were used. For the inlet 22, the turbine exit total pressure for the F100-PW-100 engine was used. A nozzle inlet Mach number of 0.5 was assumed. At the nozzle exit 26, assuming perfect expansion, the exit static pressure was set to the sea-level ambient value. Using the pressure isentropic relationship of Eq. 1, the design exit Mach number was determined.

$$\frac{p_t}{p} = \left[1 + \frac{1}{2}(\gamma - 1)Ma^2\right]^{\frac{\gamma}{\gamma-1}} \qquad \text{Eq. 1}$$

Knowing the Mach number, the exit area ratio was determined with the relationship shown below. Having arbitrarily set the throat area (A*) to 144-in², the nozzle exit area was calculated. Using the assumed inlet Mach number, the corresponding area ratio and inlet area was determined by Eq. 2.

$$\frac{A}{A*} = \frac{1}{Ma}\left[\frac{1 + \frac{1}{2}(\gamma-1)Ma^2}{\frac{1}{2}(\gamma+1)}\right]^{\frac{1(\gamma+1)}{2(\gamma-1)}} \qquad \text{Eq. 2}$$

Table 1 summarizes the flow and geometric parameters. It should be noted that the nozzle 10 may also be configured to have a circular cross-section throughout. In the present embodiment, the diverging section (from throat 24 to exit 26) was shaped to be rectangular for simpler implementation of the ramp mechanism. As such, the exit radius in Table 1 is actually half of the rectangular height of the nozzle exit.

2.2 Spline Generation

With the cross-sectional areas and nozzle wall radial values known, the axial positions of the throat 24 and exit 26 were determined in order to proceed with the nozzle contour design. Using a third-party method of characteristics MATLAB code, the minimum length from the throat to the exit was determined; the inlet-to-throat distance was set to the same value. With three coordinates known, the method of quartic piecewise splines was employed to generate the nozzle geometry according to Eq. 3:

$$S_i = a_i + b_i(x-x_i) + c_i(x-x_i)^2 + d_i(x-x_i)^3 + e_i(x-x_i)^4 \qquad \text{Eq. 3}$$

The need for a $4^{th}$ order spline comes from the flow field experiencing both subsonic and supersonic flow. With only three known axial and radial coordinates at the inlet, throat, and exit, only two piecewise quartic splines were needed, and accordingly, a total of 10 boundary conditions were required and are tabulated below. Typically, a piecewise quartic spline must satisfy $1^{st}$, $2^{nd}$, and $3^{rd}$ order continuity at each defining coordinate node. For this case, however, special boundary conditions at the known nodes were implemented in order to yield a curve that more or less represents a typical CV-DV nozzle. The conditions shown in Table 2 also ensure shock-free flow under design conditions.

The exit angle ($\varphi_e$) is defined as the maximum angle between the nozzle throat and exit coordinates:

$$\phi_e = \tan^{-1}\left(\frac{y_e - y_t}{x_e - x_t}\right) \qquad \text{Eq. 4}$$

With the point intervals and boundary conditions known, the two quartic equations became coupled, forming a linear system of equations. The system, shown below, was easily solved to obtain the remaining 6 coefficients for both splines.

$$\begin{bmatrix} \Delta x_{it}^2 & \Delta x_{it}^3 & \Delta x_{it}^4 & 0 & 0 & 0 \\ 2\Delta x_{it} & 3\Delta x_{it}^2 & 4\Delta x_{it}^3 & 0 & 0 & 0 \\ 2 & 6\Delta x_{it} & 12\Delta x_{it}^2 & -2 & 0 & 0 \\ 0 & 0 & 0 & \Delta x_{te}^2 & \Delta x_{te}^3 & \Delta x_{te}^4 \\ 0 & 0 & 0 & 2\Delta x_{te} & 3\Delta x_{te}^2 & 4\Delta x_{te}^3 \\ 0 & 0 & 0 & 2 & 6\Delta x_{te} & 12\Delta x_{te}^2 \end{bmatrix} \begin{Bmatrix} c_1 \\ d_1 \\ e_1 \\ c_2 \\ d_2 \\ e_2 \end{Bmatrix} = \begin{Bmatrix} y_t - a_1 \\ 0 \\ 0 \\ y_e - a_2 \\ \tan\phi_e \\ 0 \end{Bmatrix} \qquad \text{Eq. 5}$$

After solving the system, and making a single vector of spline points, the continuity at the inlet and throat was checked. Table 3 shows that continuity is maintained and no shocks should appear in the validation results. Given that the $2^{nd}$ derivative at the inlet of the first spline was not set to zero, as with the $1^{st}$ derivative, the value shown in Table 3 is reasonable.

Figure 2:
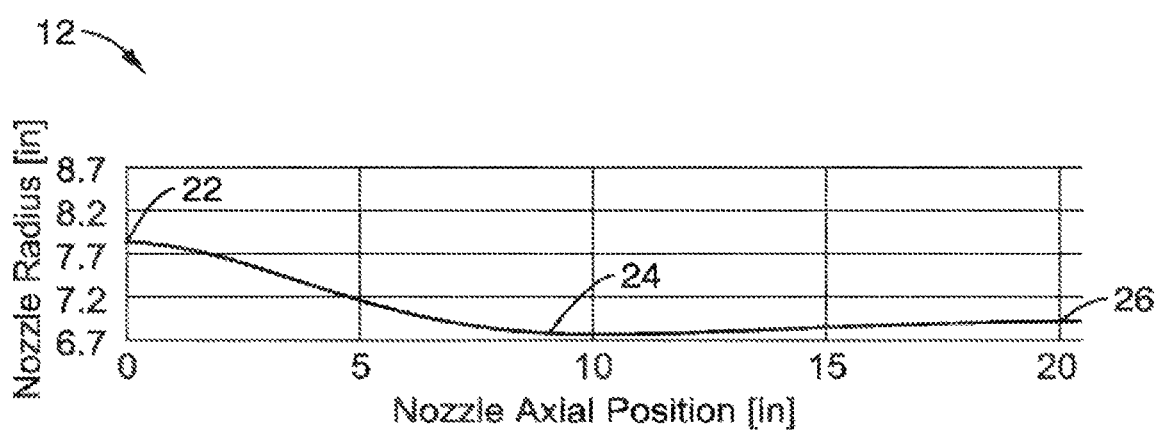
FIG. 2 shows a plot illustrating an exemplary contour (nozzle radius vs. axial position) for the nozzle wall of FIG. 1.

The resulting spline is shown in FIG. 2, which shows the contour for the nozzle wall 12. While the diverging section barely expands under the sea-level design conditions, the geometry is in accordance with the isentropic relationships.

2.3 Validation

Figure 3A:
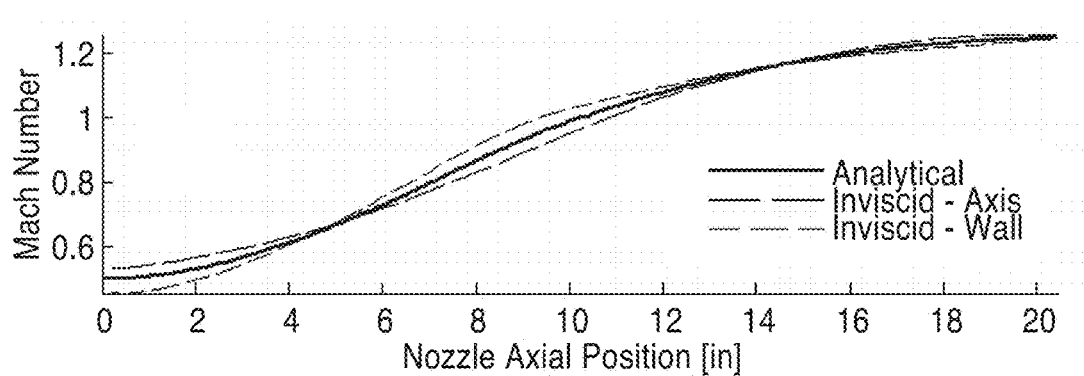
FIG. 3A and FIG. 3B show plots of inviscid numerical results compared to the corresponding analytical data for speed (FIG. 3A) and pressure (FIG. 3B).
Figure 3B:
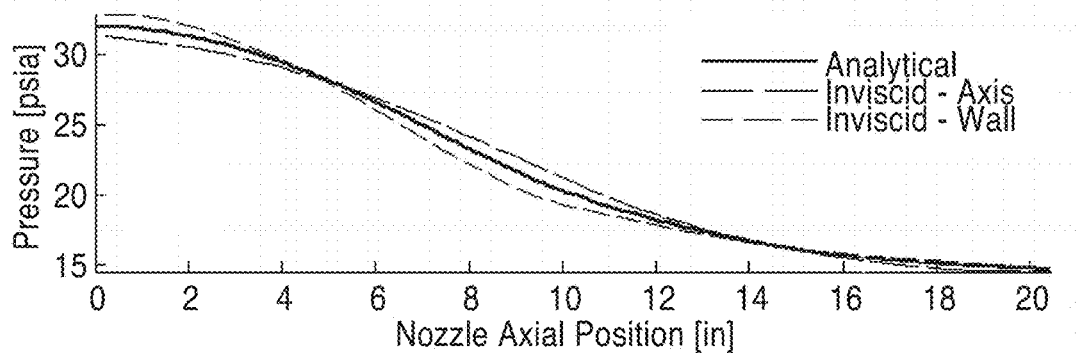

The baseline nozzle geometry and resulting flow were first validated. A MATLAB script was created that obtains the analytical Mach number and pressure ratio data via interpolation for the corresponding area ratios of the designed nozzle. The analytical, isentropic data was compared to the inviscid results from an axis-symmetric ANSYS Fluent simulation. The data from the nozzle axis and wall were exported for the comparison, shown in FIG. 3A and FIG. 3B, which presents inviscid numerical results compared to the corresponding analytical data for Mach number and pressure, respectively.

There is reasonable agreement between the analytical and numerical, inviscid data throughout the nozzle, with the exception of the discrepancies near the throat (x=10.22-in). Due to the two-dimensional flow in the nozzle, the flow chokes sooner or later than expected due to the nature of the flow demonstrated in FIG. 4, which shows mach contours of the axis-symmetric inviscid data (the plane was mirrored to visualize the entire nozzle). The gradual curvature towards the wall accounts for discrepancies in FIG. 3A and FIG. 3B.

Figure 4:
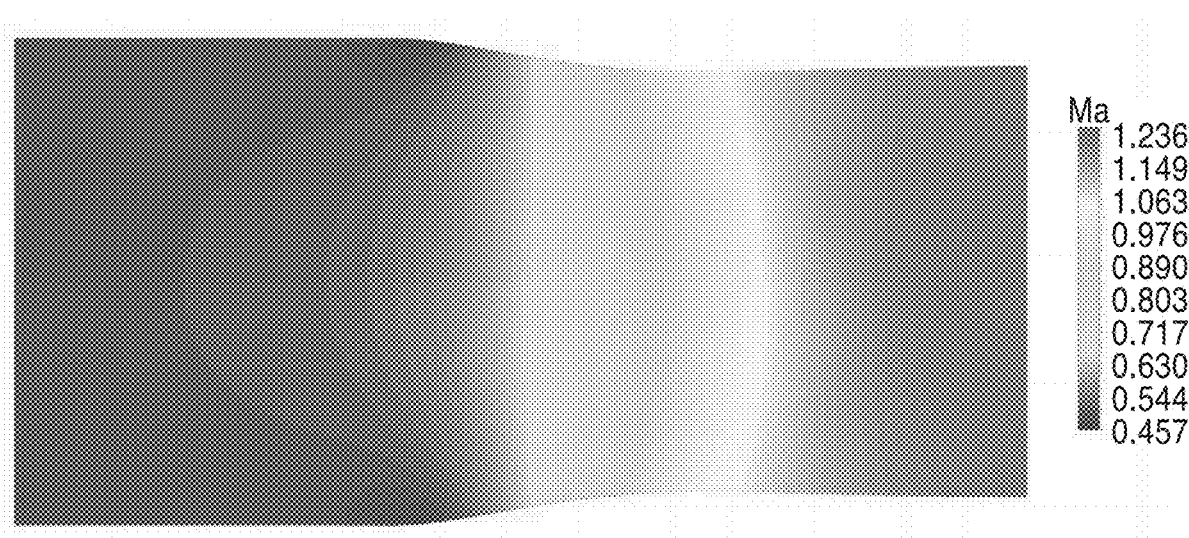
FIG. 4 is a plot showing mach contours of the axis-symmetric inviscid data (the plane was mirrored to visualize the entire nozzle).

As depicted in FIG. 4 an inlet duct (12-in long) was added to the geometry. This ensured the flow developed enough before reaching the throat.

The mass flow rate (Eq. 6 below) was also used as a metric for validation. The parameter was evaluated at the nozzle inlet, using the definition for mass flow rate. The resulting values, along with the percentage in error are shown in Table 4.

$$\dot{m} = \rho v A \qquad \text{Eq. 6}$$

3. Thrust Vectoring Ramp Design

While the thrust vectoring ramps 14/16 are shown in FIG. 1 such that the flow is directed downward in all simulations, it is appreciated that the mechanism can be configured to vector the thrust in either pitch or yaw direction (depending on the implementation of the ramps). The effect of the ramps' length and angle on the deflected flow was investigated, having kept the axial positions fixed.

3.1 Axial Position

While not shown in the present description, the TVC mechanism of nozzle 10 may use fluidic secondary injection. However, placing the port (not shown) upstream of the threat yields little benefit, as the flow is still accelerating in the converging section. As such, the first ramp 14 was fixed at nozzle throat 24 and the second ramp 16 fixed at the exit 26, with an exemplary configuration shown in FIG. 1.

While axial positions of the ramps 14/16 may be varied to modify the flow, the ramps 14/16 were kept axially fixed for this investigation, since these positions provide the maximum vectoring of the flow, based on the geometric considerations described in the following section.

3.2 Length and Angle

With the axial locations of the ramps 14/16 fixed, the variable parameters of particular interest were the ramp length ($L_r$) and angular position ($\theta$) (assuming the width runs across the entire cross-sectional area). Three values (low, medium, high) were chosen for each parameter, listed in Table 5. All ramp length ($L_r$) and angular values ($\theta$) were arbitrarily selected. One trial, however, was used to investigate how large the ramp angle could be set. The position of 60° led to instability for the steady-state trials, indicating that the exit flow became highly unsteady. The high value for $\theta$ was then kept to 40°.

With the selected length and angle values, nine configurations result. That is, there are three ramp angles per length value. It should be noted then, that the parameters are kept the same for each ramp in all configurations (i.e. one ramp is not shorter nor is one positioned at a lower angle than the other). Each configuration will henceforth be referred to by a subcase identifier, shown in Table 6.

Figure 5:
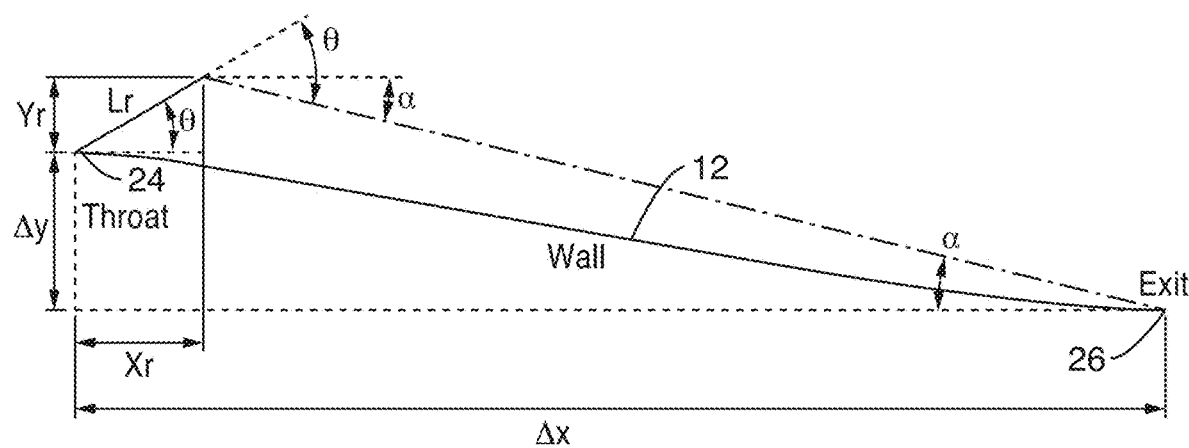
FIG. 5 is a schematic diagram of ramp geometry with respect to several parameters.

One metric for comparing the ramps' angular setting to the angle of the deflected flow is considering the average of θ and an additional angle. This angle (α) is formed when a line is connected from the edge of the throat ramp to the nozzle exit, schematically illustrated in FIG. 5, which shows the angle of interest (α) and the several parameters used to determine its value.

Using the values for θ and Lr, the triangle lengths $x_r$ and $y_r$ were determined. Knowing the differences in the throat and exit coordinates (Δy and Δx), the sides of the triangle containing α were calculated. Finally, α was determined by taking the arctangent of the triangle sides. The average value between θ and α (denoted as ψ) were calculated for each subcase configuration, tabulated below in degrees.

$$\psi = \frac{\theta + \alpha}{2} \qquad \text{Eq. 7}$$

Resulting values of ψ for each ramp configuration are shown in Table 7. The values of ψ presented in Table 7 will be compared to the mean flow deflection angle from all simulations.

To analyze thrust vectoring performance, the flow deflection distribution across the ramp exit plane was collected for each trial. The data was then numerically integrated, using the trapezoidal rule, along the boundary y-coordinates. The integrals were divided by the corresponding 3D exit area for each trial to obtain an area-weighted integral. The final equation for the flow deflection data reduction is shown in Eq. 8.

$$I_\delta = \left(\frac{1}{A_{exit}}\right)\int_{Y_{min}}^{Y_{max}} \delta \, dy \qquad \text{Eq. 8}$$

The exit area is defined by the height h* and width w. A simplified diagram showing the parameters h* and w is shown in FIG. 6, which presents a very simplified 3D configuration of the nozzle in this investigation, showing the relevant parameters for determining the exit area with deployed ramps. The height is defined as the sum of the absolute minimum y-coordinate and maximum y-coordinate. Given that the investigation originally had a circular nozzle in mind, the constant width was determine in the following manner:

1. Determine the circular exit area with the radius from Table 1.

$$A_{e,circ} = \pi \cdot r_e^2 \qquad \text{Eq. 9a}$$

2. Equate the baseline, rectangular area to that value.

$$A_{e,rec} = w \cdot h = A_{e,circ} \qquad \text{Eq. 9b}$$

3. Determine the width, using a height h that is equal to the diameter from the circular area The process described above was essential in maintaining the area ratio distribution from the produced nozzle wall curve in FIG. 2.

3.3 The Ramp Mechanism

Figure 7:
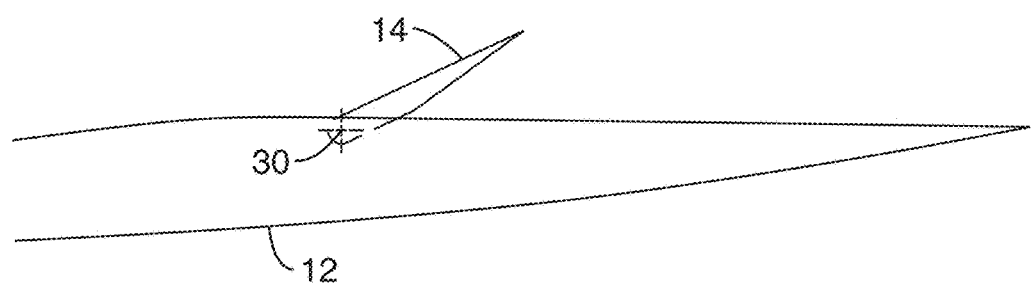
FIG. 7 is a sample schematic diagram showing an arbitrary nozzle wall and ramp thickness, with rotation along a hinge as one method to deploy the ramp placed at the throat.

Actuation of the ramps 14/16 may be moved into a given configuration using any one of a variety of mechanisms available in the art, e.g. actuators, powered by electric motors or the like. A simplified schematic is presented below in FIG. 7 showing the throat ramp 14 rotatably fixed along a hinge 30 (denoted by the center mark in the schematic). FIG. 7 shows an arbitrary nozzle wall 12 and ramp thickness 14. It is appreciated that rotation along hinge 30 is one method to deploy the throat ramp 14, and that other configurations may be contemplated.

The actuation mechanism for the exit ramp 16 may vary from that of the throat ramp 14. One contemplated configuration is positioning the ramp 16 in a manner similar to a fowler flap (not shown) on an aircraft wing. During non-TVC operation, the exit ramp 16 could be stowed away, reducing the external profile of the engine.

4. Fluid Mechanics Model
4.1 Governing Equations

In fluid mechanics, the three mathematical formulations below convey the conservation of three properties: mass, momentum and energy. The equations are the result of carrying out a control volume analysis using a fixed, infinitesimal control volume. The equations, in their most general form, are shown below:

$$\text{Continuity } \frac{\partial \rho}{\partial t} + \nabla \cdot (\rho \vec{V}) = 0, \qquad \text{Eq. 10a}$$

$$\text{Momentum } \rho \frac{D\vec{V}}{Dt} = -\nabla p + \rho \vec{g} + \nabla \cdot \tau'_{ij}, \qquad \text{Eq. 10b}$$

$$\text{Energy } \rho \frac{Dh}{Dt} = \frac{Dp}{Dt} + \nabla \cdot (\kappa \nabla T) + \tau'_{ij}\frac{\partial u_i}{\partial x_j}, \qquad \text{Eq. 10c}$$

where $$\tau'_{ij} = \mu\left(\frac{\partial u_i}{\partial x_j} + \frac{\partial u_j}{\partial x_i}\right) + \delta_{ij}\lambda(\nabla \cdot \vec{V}).$$

In the equation above for the stress tensor (T'), $\delta_{ij}$ is the Kronecker delta function, which is defined by Eq. 11. Additionally, the variable λ is approximated as −⅔ μ from Stoke's hypothesis. This term becomes zero for incompressible flows:

$$\delta_{ij} = \begin{cases} 1 & i = j \\ 0 & i \neq j \end{cases} \qquad \text{Eq. 11}$$

For this investigation, all simulations were done under steady-state conditions. The decision to go time-independent was only valid to a certain extent. As mentioned above, large values for θ lead to unsteadiness in the form of oscillations in the solution, ultimately causing the solution to diverge within a few iterations.

The fluid in all simulations was selected as pure air. In reality, though, there is a finite amount of fuel mass in the fluid mixture from the engine's combustor. This is even truer when the engine's afterburner is engaged. The investigation at hand, however, assumes negligible fuel mass such that using calorically perfect air as the fluid is valid. Table 8 summarizes the chosen property definitions for air.

The viscosity for air was set to vary with temperature, using the Sutherland formula, which is well suitable for compressible flows. In the formulation above, the variables $T_0$, S, and $\mu_0$ are the reference temperature, effective temperature, and reference dynamic viscosity respectively, listed in Table 9.

The density was calculated using the ideal gas law for compressible flow, which includes the operating pressure parameter, $p_{op}$ which is approximated as the average $p_{abs}$ in the flow (Eq. 12). The Fluent User's Guide suggests a $p_{op}$ of zero for flows with Mach numbers greater than 0.1 when the ideal gas law is used. Additionally, an operating pressure of zero is acceptable for high Mach number flows due to larger changers in pressure, eliminating the issue of round-off error witnessed in low Mach number flows.

$$P_{abs} = P_{op} + P_{gauge} \qquad \text{Eq. 12}$$

Lastly, in Table 8, R is the gas constant for air in English units (53.35-ft.lbf/lbm.° R).

4.2 Numerical Solver

ANSYS Fluent was used as the solver, which provides two types of solvers: pressure-based and density-based. For the problem at hand, either solver, with their current formulation, may have been selected. The former was selected, in which a pressure correction equation is implemented to resolve the pressure field. With the pressure-based solver, the continuity and momentum equations are discretized in the following form:

$$\text{Continuity} \sum_{f}^{N_{faces}} J_f A_f = 0 \qquad \text{Eq. 13a}$$

$$X\text{-momentum } a_p u_1 = \sum_{nb} a_{nb} u_{nb} + \sum p_f A \cdot \hat{i} + S \qquad \text{Eq. 13b}$$

In Eq. 13a, the term $J_f$ is the mass flux through a given cell face f, with a face area of $A_f$. The flux term is defined more explicitly in the Fluent Theory Guide. In Eq. 13b, $a_P$ and $a_{nb}$ are linearized coefficients for a given transport variable (e.g. velocity component ui in Eq. 13b). The subscript "nb" refers to the neighboring, adjacent cells of the current cell center "p". Lastly, the term S is a source term.

4.2.1 The Segregated and Coupled Algorithms

When considering the governing equations (Eq. 10a through Eq. 10c), one can note that the continuity equation lacks a pressure term. To address this discrepancy, ANSYS Fluent provides two methods in obtaining a solution with the pressure-based solver: the segregated algorithm and coupled algorithm. The former applies the pressure-corrector process, which is as follows:

| | |
|---|---|
| 1. Define a pressure field guess | p* |
| 2. Obtain velocity components from momentum equation | $u_1$*, $u_2$*, $u_3$* |
| 3. Correct pressure | p = p* + p' |
| 4. Correct velocity field in the same manner | $\vec{V} = \vec{V}* + \vec{V}'$ |
| 5. Update guess for pressure field | |

The pressure-corrector process does not yield the actual algorithms that can be used to obtain a solution, as the definition of p' remains unknown. A derivation (omitted here) produces a system of equations that generates the pressure correction term.

ANSYS Fluent implements several pressure-corrector algorithms to choose from, some of which are listed below:
 (a) Semi-Implicit Method for Pressure-linked Equations (SIMPLE),
 (b) SIMPLE-Consistent (SIMPLEC),
 (c) Pressure-Implicit with Splitting of Operators (PISO).

In contrast, the coupled algorithm approach reduces steps 2 and 3 from the list above to a single step. This is achieved by simultaneously solving the momentum and "pressure-based continuity" equations. In the derivation of the p' formulation, the continuity equation is discretized in a manner that incorporates the pressure correcting term.

While each approach has their merits, the coupling approach was used in this investigation. For steady-state flows, the coupled algorithm is superior to the segregated approach. Coupling pressure and velocity, however, requires more memory by a factor of 2 at most.

4.2.2 Pressure-Velocity Coupling

As mentioned in the previous section, the coupled algorithm, a fully implicit approach, solves the continuity and momentum equations simultaneously. Equations 13a and 13b can be rewritten by introducing the more explicit definition of $J_f$, which includes pressure terms, and defining the pressure gradient of Eq. 13b as follows:

$$\sum_{f} p_f A_k = -\sum_{j} a^{u_k p} p_j \qquad \text{Eq. 14}$$

In Eq. 14, the coefficient $a^{u_k p}$ results from the Gauss divergence theorem and the general pressure interpolation equation, which uses the momentum equation coefficients of Eq. 13b. The continuity and momentum equations for component k can thus be defined as:

$$\text{Continuity} \sum_{k} \sum_{j} a_{ij}^{p u_k} u_{kj} + \sum_{j} a_{ij}^{pp} p_j = b_i^p \qquad \text{Eq. 15a}$$

$$\text{Momentum} \sum_{j} a_{ij}^{u_k u_k} u_{kj} + \sum_{j} a_{ij}^{u_k p} p_j = b_i^{u_k} \qquad \text{Eq. 15b}$$

The coupling of pressure and velocity is more apparent when the system is fully defined in matrix form:

$$\begin{bmatrix} a_{ij}^{pp} & a_{ij}^{pu_1} & a_{ij}^{pu_2} & a_{ij}^{pu_3} \\ a_{ij}^{u_1 p} & a_{ij}^{u_1 u_1} & a_{ij}^{u_1 u_2} & a_{ij}^{u_1 u_3} \\ a_{ij}^{u_2 p} & a_{ij}^{u_2 u_1} & a_{ij}^{u_2 u_2} & a_{ij}^{u_2 u_3} \\ a_{ij}^{u_3 p} & a_{ij}^{u_3 u_1} & a_{ij}^{u_3 u_2} & a_{ij}^{u_3 u_3} \end{bmatrix} \begin{Bmatrix} p'_i \\ u'_{1_i} \\ u'_{2_i} \\ u'_{3_i} \end{Bmatrix} = \begin{Bmatrix} -r_i^p \\ -r_i^{u_1} \\ -r_i^{u_2} \\ -r_i^{u_3} \end{Bmatrix} \qquad \text{Eq. 16}$$

In Eq. 16 above, the r terms are the respective residuals for pressure and the flow velocity components. Additionally, the system of equations is solved using the coupled form of the algebraic multigrid (AMG) solver, as it is a critical component of the pressure-based solver (the details of which are omitted here).

4.2.3 Gradients and Derivatives

Another important set of quantities that require evaluation are convective and diffusive terms. ANSYS Fluent provides three methods to choose from for the evaluation of gradients, listed below.
 (a) Green-Gauss Cell-based
 (b) Green-Gauss Node-based
 (c) Least Squares Cell-based For this investigation, the default method was selected (least squares cell-based). This method assumes linear variation of the solution. The gradient of a given scalar φ for cell center co is defined by Eq. 17a.

$$\nabla \phi_{c_0} \cdot \Delta r_i = \phi_{c_j} - \phi_{c_0} \qquad \text{Eq. 17a}$$

$$(\phi_i)_{c_0} = \sum_{j=1}^{n} W_{j,0}^i \cdot (\phi_{c_j} - \phi_{c_o}) \qquad \text{Eq. 17b}$$

By writing equations for the other surrounding cells, a system of equations results. Employing the Gram-Schmidt decomposition process, a matrix of weights (W) for each cell results. The resulting system, defining the weighted $i^{th}$ component of a gradient, is shown in Eq. 17b.

4.2.4 Interpolation Schemes

In Fluent, an interpolation scheme is selected for convective flux terms. Several upwind interpolation schemes are available to choose from. Diffusive terms, on the other hand, are by default always discretized using a central difference scheme, and are consequently always $2^{nd}$ order accurate.

Generally speaking, the term "upwind" refers to the manner in which the value of a property $\varphi$ is calculated at a given cell face. The value is interpolated using values upstream of that particular cell face, with respect to normal velocity direction. Given the potential applications of the TVC mechanism under consideration, second-order accuracy was desired.

$$\varphi_f = \varphi + \nabla\varphi \cdot \vec{r} \qquad \text{Eq. 18}$$

In Eq. 18, the face value of a property $\varphi$ is determined using the centroid value of the upstream cell, and $\vec{r}$ is the displacement vector between the given cell face and upstream cell centroid. For this investigation, the second-order upwind scheme was selected for all flow properties (e.g. continuity, momentum, turbulent kinetic energy, etc.).

Having selected the pressure-based solver, an interpolation scheme was selected for the pressure values, as well. For this investigation, the second-order interpolation scheme was selected, as it is recommended when analyzing compressible flows. This scheme computes a cell's face pressure value in a manner using Eq. 18.

4.2.5 Solution Controls and Monitors

The flow Courant number, or Courant-Friedrichs-Lewy (CFL) condition, was set to a maximum of 50. Despite simulating the subcases at steady-state, the CFL value determines a time step size.

$$CFL = \frac{u\Delta t}{\Delta x} \qquad \text{Eq. 19}$$

The value was based off the preliminary simulations, in which the solutions would diverge with CFL values above 50.

Following the CFL setting were the under-relaxation factors ($\omega$) for density, turbulence, and energy (or "explicit relaxation" for momentum and pressure). The values used in all simulations are listed in Table 10. The under-relaxation factor essentially reduces the change of a given flow parameter per iteration. If stability issues are witnessed, the factor can be reduced as a mean for troubleshooting.

$$\varphi = \varphi_{old} + \omega\Delta\varphi \qquad \text{Eq. 20}$$

The default values for density, turbulent viscosity ratio, and energy are 1. They were reduced based off the preliminary simulations mentioned above. The default explicit relaxation values for momentum and pressure were used.

The last solution control parameters that had to be set were the residual monitors. For all simulations, all flow parameters (e.g. continuity, x-velocity, energy, etc.) were given a criteria of $10^{-6}$ for the convergence residuals. The residual for a given flow property is defined below.

$$R_p = a_p\phi_p + \sum_{nb} a_{nb}\phi_{nb} - b_p \qquad \text{Eq. 21}$$

Majority of the simulations never fully converged, though, as unsteadiness became apparent in the residual history plots. The residuals of flow properties reduced to values on the order of $10^{-3}$ to $10^{-5}$.

4.3 Modeling Turbulence

There are two approaches in modeling the mixing, eddies, and random fluctuations of fluid flow that is known as turbulence. These methods, the Boussinesq approximation and Reynolds stress transport modeling (RSM), close the Reynolds-averaged Navier-Stokes (RANS) system of equations. The need for closure arises as a consequence of time-averaging the Navier-Stokes equations.

4.3.1 RANS (Incompressible Flow)

The RANS approach makes use of the definition of a temporal average for a given property Q, defined below by Eq. 22. The parameter T is an appropriate time scale, over which the turbulence field can be averaged to obtain statistically realistic average values. This average is that of a property experiencing fluctuations, such as velocity and pressure in FIG. 25.

$$\overline{Q} = \frac{1}{T}\int_{t}^{t+T} Q\,dt \qquad \text{Eq. 22}$$

This fluctuation is the deviation from the average. The overbar notation in Eq. 22 are to denote Reynolds-averaged terms.

For any property, the temporal average of a fluctuation is zero, while the mean-square of the fluctuation is nonzero, as shown below in Eq. 23a and Eq. 23b:

$$\overline{Q'} = \frac{1}{T}\int_{t}^{t+T} (Q - \overline{Q})\,dt = \overline{Q} - \overline{\overline{Q}} = 0 \qquad \text{Eq. 23a}$$

$$\overline{Q'^2} = \frac{1}{T}\int_{t}^{t+T} Q'^2\,dt \neq 0. \qquad \text{Eq. 23b}$$

Before obtaining the RANS equations, the continuity and momentum equations (Eq. 10a and Eq.10b) are defined using index notation for the constant density case:

$$\frac{\partial u_i}{\partial x_i} = 0 \qquad \text{Eq. 24a}$$

$$\rho\frac{\partial u_i}{\partial t} + \rho u_j\frac{\partial u_i}{\partial x_j} = -\frac{\partial p}{\partial x_i} + \frac{\partial(2\mu s_{ij})}{\partial x_j} \qquad \text{Eq. 24b}$$

where $$s_{ij} = \frac{1}{2}\left(\frac{\partial u_i}{\partial x_j} + \frac{\partial u_j}{\partial x_i}\right).$$

The term $s_{ij}$ above is the strain-rate tensor. The product shown in Eq. 24b yields the viscous stress tensor. Employing the properties of Eq. 23a and Eq. 23b, the continuity and momentum equations can then be rewritten in their time-averaged form:

$$\frac{\partial \overline{u_i}}{\partial x_i} = 0, \qquad \text{Eq. 25a}$$

$$\rho\frac{\partial \overline{u_i}}{\partial t} + \rho\overline{u_j}\frac{\partial \overline{u_i}}{\partial x_j} = -\frac{\partial \overline{p}}{\partial x_i} + \frac{\partial}{\partial x_j}\left(2\mu s_{ij} - \rho\overline{u'_i u'_j}\right). \qquad \text{Eq. 25b}$$

The two formulations present the RANS equations. It should be noted, though, that Eq. 25b is a simplified form of the time-averaged momentum equation. The simplification is made using the following identity:

$$u_j \frac{\partial u_i}{\partial x_j} = \frac{\partial}{\partial x_j}(u_j u_i) - u_i \frac{\partial u_j}{\partial x_j} = \frac{\partial}{\partial x_j}(u_j u_i).$$ Eq. 26

It should also be noted that the time-averaged equations are merely mathematical simplifications of the Navier-Stokes equations.

In Eq. 25b, the negative product on the right-hand side is defined as the Reynolds stress tensor. It is this quantity that leads to a closure problem—the RANS equations require additional transport equations to determine the Reynolds stresses. Specifically, the tensor is symmetric, yielding six additional unknown quantities. The issue of an unclosed system of equations has led to the development of turbulence models that do so.

4.3.2 Favre Averaging (Compressible Flow)

So far in the description of the governing equations, the incompressible form of the Navier-Stokes equations have undergone the time-averaging process. Given that the current investigation involves compressible flow, the compressible form of the equations will now be averaged, using the Favre averaging method, defined below by Eq. 27. This approach uses the tilde to denote the density-weighted Favre averages and double prime to denote the fluctuations with respect to said time-averages.

$$\tilde{Q} = \frac{\overline{\rho Q}}{\overline{\rho}} = Q - Q'' \text{ where } \overline{Q''} \neq 0$$ Eq. 27

In the Eq. 27, the Favre average of a given property Q is defined as the density-weighted Reynolds average. Using this definition, along with the previous time-averaging process as in the RANS case, the compressible Navier-Stokes and energy equations can be time-averaged to the following form. It should be noted that the Favre-averaged energy equation is shown since this investigation involves compressible flow and the energy equation cannot be neglected:

$$\frac{\partial \overline{\rho}}{\partial t} + \frac{\partial}{\partial x_i}(\overline{\rho} \tilde{u}_i) = 0$$ Eq. 28a $$\frac{\partial (\overline{\rho} \tilde{u}_i)}{\partial t} + \frac{\partial (\overline{\rho} \tilde{u}_i \tilde{u}_j)}{\partial x_j} = -\frac{\partial \overline{p}}{\partial x_i} + \frac{\partial \overline{\tau_{ji}}}{\partial x_j} - \frac{\partial (\overline{\rho u_i'' u_j''})}{\partial x_j}$$ Eq. 28b $$\frac{\partial (\overline{\rho} \tilde{E})}{\partial t} + \frac{\partial (\overline{\rho} \tilde{u}_j \tilde{H})}{\partial x_j} = RHS$$ Eq. 28c where $$RHS = \frac{\partial}{\partial x_j}\left[-q_{L_j} - \overline{\rho u_j'' h''} + \overline{\tau_{ji} u_i''} - \overline{\rho u_j'' \frac{1}{2} u_i'' u_i''}\right] + \frac{\partial}{\partial x_j}\left[\tilde{u}_i(\overline{\tau_{ij}} - \overline{\rho u_i'' u_j''})\right]$$

$$E = \tilde{e} + \frac{\tilde{u}_i \tilde{u}_i}{2} + \frac{\overline{u_i'' u_i''}}{2}$$

$$H = \tilde{h} + \frac{\tilde{u}_i \tilde{u}_i}{2} + \frac{\overline{u_i'' u_i''}}{2}$$

$$\overline{\tau_{ij}} = 2\mu s_{ij} - \frac{2}{3}\frac{\partial u_k}{\partial x_k}\delta_{ij}$$

$$q_{L_j} = -\frac{\mu}{Pr_L}\frac{\partial h}{\partial x_j}$$

Above, the terms E and H are in essence the total energy and enthalpy, respectively, as both terms include the turbulence kinetic energy. The term $t_{ij}$ is the viscous stress tensor (the mean viscous stress tensor is shown above), which includes the strain-rate tensor from Eq. 24b. Lastly, the term $q_{L_j}$ is the heat transport, which is defined with the laminar Prandtl number ($Pr_L = c_p \mu/K$). This definition holds true with the assumption of a calorically perfect fluid. Similar to the simplifications that are Eq. 25a and Eq. 25b, Eq. 28a through Eq. 28c are mathematically simplified versions of the compressible Navier-Stokes equations. The process of Favre averaging does not represent physical simplifications of the governing equations.

The process of Favre averaging is essentially the first step in obtaining the proper time-averaged equations for compressible flow. The remainder of the process, however, is omitted here. Time-averaging the compressible Navier-Stokes equations is what allows for additional fluctuations in thermodynamic properties and dilatation (fluid element expansion) to be accounted for. This is even more important for flows with shockwaves.

4.3.3 Boussinesq Approximation

This turbulence modeling approach employs a straightforward relationship between the Reynolds stresses and mean velocity gradients, shown below.

$$-\overline{u_i' u_j'} = 2\frac{\mu_t}{\rho} S_{ij} - \frac{2}{3} k \delta_{ij}$$ Eq. 29 where $$k = \frac{1}{2}\overline{u_i' u_i'}$$

$$S_{ij} = \frac{1}{2}\left(\frac{\partial \overline{u_i}}{\partial x_j} + \frac{\partial \overline{u_j}}{\partial x_i}\right)$$

Above, the variable k is the turbulent kinetic energy and $S_{ij}$ is the mean strain-rate tensor. In order for this approximation to be valid, the turbulent viscosity (also known as the eddy viscosity), is assumed to be an isotropic scalar. This approximation serves as the basis for many of the current turbulence models, such as the k-ε and k-ω models.

4.3.4 RSM Approach

This $2^{nd}$ order closure method calls for solving transport equations for each of the Reynolds stress tensor terms. This approach calls for an additional 5 equations and 7 equations for 2D and 3D simulations respectively. While the concept of turbulent viscosity is eliminated, the additional transport equations generate a penalty in computational cost. Furthermore, this approach was considered to be beyond the scope of this investigation and was not selected.

4.4 Selecting a Turbulence Model

A turbulence model had to be selected to capture not only the boundary layers along wall surfaces, but the expected shockwaves as well. ANSYS Fluent provides several models to select from, such as the Spalart-Allmaras (SA), k-ε, k-ω, detached eddy simulation (DES), and large eddy simulation (LES) models. Fluent also includes variations of some models (e.g. RNG k-ε and SST k-ω). Given the number of available models in Fluent, along with the many details behind each, only a few models will be discussed.

4.4.1 One-equation Models

As mentioned above, the Boussinesq approximation serves as the foundation for models that close the system in Eq. 25b. There are many models to serve that purpose, and are categorized based on the number of transport equations introduced to the overall system. There are zero-equation models, such as the Prandtl Mixing Length model, but such models will not be discussed here, as the list of models in Fluent have a minimum of at least one equation.

The Spalart-Allmaras model solves one transport equation, in the form of the turbulent kinetic energy, for a modified form of the turbulent kinematic viscosity (μt). In essence, the second right-hand side term in Eq. 29 is neglected in computing the Reynolds stresses. As a one-equation model, it is best suited for pure wall-bounded flow, as it cannot account for sudden changes in length scale. Its formulation makes it a low-Re model, requiring proper near-wall treatment (i.e. wall functions cannot be used). The formulation in Fluent, however, employs wall functions if the near-wall grid is not refined enough. Other one-equation models include the Wolfstein and Baldwin-Barth models, but are not discussed here, again, as they are not implemented within the release of Fluent used for this investigation.

4.4.2 Two-equation Models

While there are numerous two-equation turbulence models that close the system of equations in Section 4.3.1 and Section 4.3.2, only two models will be discussed in this section: the k-ε and k-ω models.

The first model (k-ε) presents a transport equation for the turbulent kinetic energy and dissipation rate (ε), where the latter is defined as the product of $2v\overline{s_{1j}s_{1j}}$. The dissipation rate is governed by the large eddies in the turbulent flow, as those eddies carry the Reynolds stress and especially the turbulent energy. This model is formulated with the assumptions that the flow is fully turbulent and the effects of molecular viscosity are negligible. Given that the standard k-ε model was not selected to model the viscous effects in this investigation, its corresponding formulations are omitted.

Similarly, the Wilcox k-ω model implements a transport equation for the turbulent kinetic energy and specific dissipation rate (ω). The latter can also be defined by the ratio of the turbulent dissipation rate to kinetic energy. The model is well-suited for both wall-bounded and free shear flows. One variation example is the shear-stress transport (SST) k-ω model, which is a hybrid of the standard k-ω mode and a "transformed" k-ε model. This modification allows for a greater range of applicability. Again, as this model was not used in the investigation, the transport equations are not shown.

4.4.3 Model of Choice

For this study, the realizable k-ε model (RKE) was selected. The choice was based on a comprehensive study carried out by Tian and Lu. The study compared the experimental pressure data of a nozzle with a single, secondary injection port to the numerical data with different turbulence models. The results indicated that the one-equation Spalart-Allmaras model matched the experimental distributions most accurately. As mentioned above, the RKE model was superior in matching the location of the shockwaves. Additionally, the RKE model is well-suited for channel and boundary layer flows with and without pressure gradients. The latter was thus chosen on the basis that the proposed TVC mechanism in this study is potentially patentable, and could require experimental data to verify the predicted numerical results presented in this investigation.

The term "realizable" in the RKE model name refers to a mathematical constraint satisfied by the model. Specifically, positivity is maintained for both the normal Reynolds stress term $$\overline{u_i'^2}$$

and the shear stress form of Schwarz's inequality:

$$\overline{u_i'u_j'}^2 \leq \overline{u_i'^2 u_j'^2} \qquad \text{Eq. 30}$$

Taking the Boussinesq formulation from Eq. 29, and considering only the normal Reynolds stress, the following equation results:

$$\overline{u_i'^2} = \frac{2}{3}k - 2v_t \frac{\partial \overline{u_i}}{\partial x_i}, \qquad \text{Eq. 31}$$

where $$v_t = C_\mu \frac{k^2}{\varepsilon}.$$

The equation above yields a negative normal Reynolds stress (i.e. non-realizable normal stress) if the fluid's mean strain rate becomes large enough to satisfy the following inequality:

$$\frac{k}{\varepsilon}\frac{\partial \overline{u_i}}{\partial x_i} > \frac{1}{3C_\mu} \qquad \text{Eq. 32}$$

The term $C_\mu$ above is a constant in the standard k-ε model, leading to an approximate value of 3.7 for the right-hand side of the inequality in Eq. 32 above. The RKE model maintains positivity by allowing $C_\mu$ to vary by redefining the parameter to be related to the mean strain rate and thus ultimately providing a new formulation for the turbulent viscosity (one key difference between the standard k-ε and RKE models).

A second difference between the two models is the formulation for the turbulence dissipation rate. Below, the equations are compared.

$$\varepsilon_t + \overline{u_i}\varepsilon_i = v\varepsilon_{ii} - (\overline{u_i'\varepsilon'})_i - C_{1\varepsilon}\frac{\varepsilon}{k}(\overline{u_i'u_j'})\overline{u}_{ij} - C_{2\varepsilon}\frac{\varepsilon^2}{k} \qquad \text{Eq. 33a}$$

$$\varepsilon_t + \overline{u_j}\varepsilon_j = -(\overline{u_j'\varepsilon'})_j + C_1 S_\varepsilon - \rho C_2 \frac{\varepsilon^2}{k + \sqrt{v\varepsilon}} \qquad \text{Eq. 33b}$$

What makes the latter superior is that the Reynolds stress term does not appear in the formulation. It has been found that the source terms on the right-hand side for the RKE model "behave better" in numerical analyses—especially when $2^{nd}$ order schemes are used.

4.5 Near-Wall Treatment

For viscous flows, it is particularly important to properly model the problem near wall surfaces. Failure to do so could lead to incorrect solutions near said surfaces, such as velocity vectors passing through the walls. This section discusses the background theory of near-wall turbulent flow and how to resolve that flow.

4.5.1 The Law of the Wall: Turbulent Velocity Profiles

Figure 8:
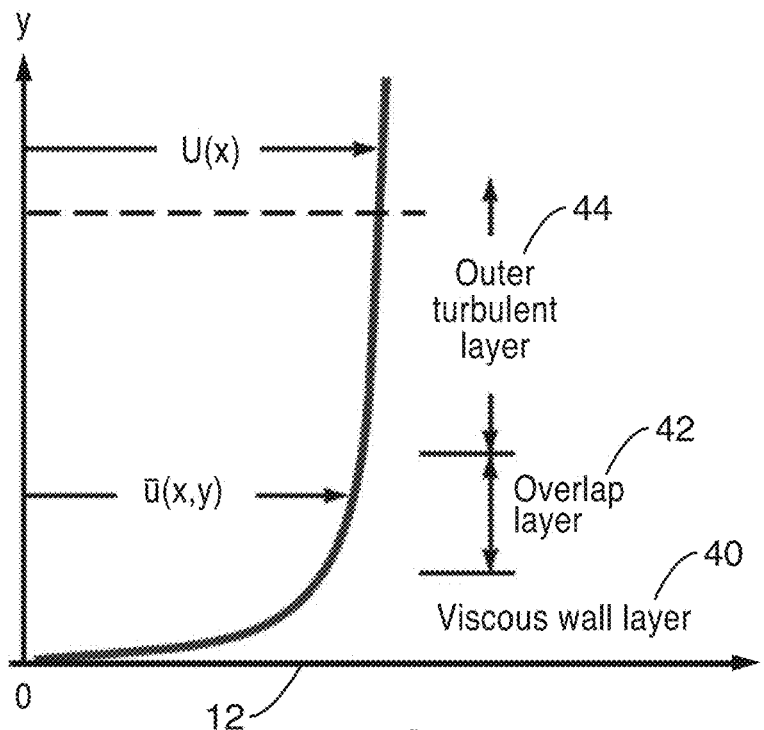
FIG. 8 is a schematic diagram of three airflow layers shown with respect to a velocity profile in Cartesian coordinates.

In turbulent flows, a fluid's boundary layer velocity profile spans over three sublayers: inner, overlap, and outer. FIG. 8 shows a diagram of the three layers with respect to a velocity profile in Cartesian coordinates. The inner layer (viscous wall layer 40) experiences dominant viscous shear effects, while the outer turbulent layer 44 is subject to dominant turbulent shear; the overlap layer 42 is subject to the effects of the other two layers.

For these three layers, three laws have been deduced using dimensional analysis to aid in the studies of near-wall flows, shown below respectively:

$$u^+ = \frac{\bar{u}}{v^*} = f\left(\frac{yv^*}{v}\right) \quad \text{Eq. 34a}$$

$$v^* = \left(\frac{\tau_w}{\rho}\right)^{1/2}$$

$$\frac{U_\infty - \bar{u}}{v^*} = g\left(\frac{y}{\delta}, \xi\right) \quad \text{Eq. 34b}$$

$$\xi = \frac{\delta}{\tau_w}\frac{dp_\infty}{dx}$$

$$\frac{\bar{u}}{v^*} = f\left(\frac{\delta v^*}{v}\frac{y}{\delta}\right) = \frac{U_\infty}{v^*} - g\left(\frac{y}{\delta}\right) \quad \text{Eq. 34c}$$

In the formulations above, the variable $v^*$, based on its dependence on the wall shear stress ($T_w$), is called the wall-friction velocity. Eq. 34a and Eq. 34b are an identity in essence, which only holds true if the respective functions g and f are logarithmic. This leads to a more defined overlap law, which is defined in one form or another depending on how close any given point is to the nearest wall.

$$\text{Overlap Law:} \begin{cases} u^+ = \frac{1}{\kappa}\ln y^+ + B & \text{Inner} \\ \frac{U_\infty}{v^*} - u^+ = -\frac{1}{\kappa}\ln\frac{y}{\delta} + A & \text{Outer} \end{cases} \quad \text{Eq. 35}$$

$$\text{where } y^+ = \frac{yv^*}{v}$$

Figure 9:
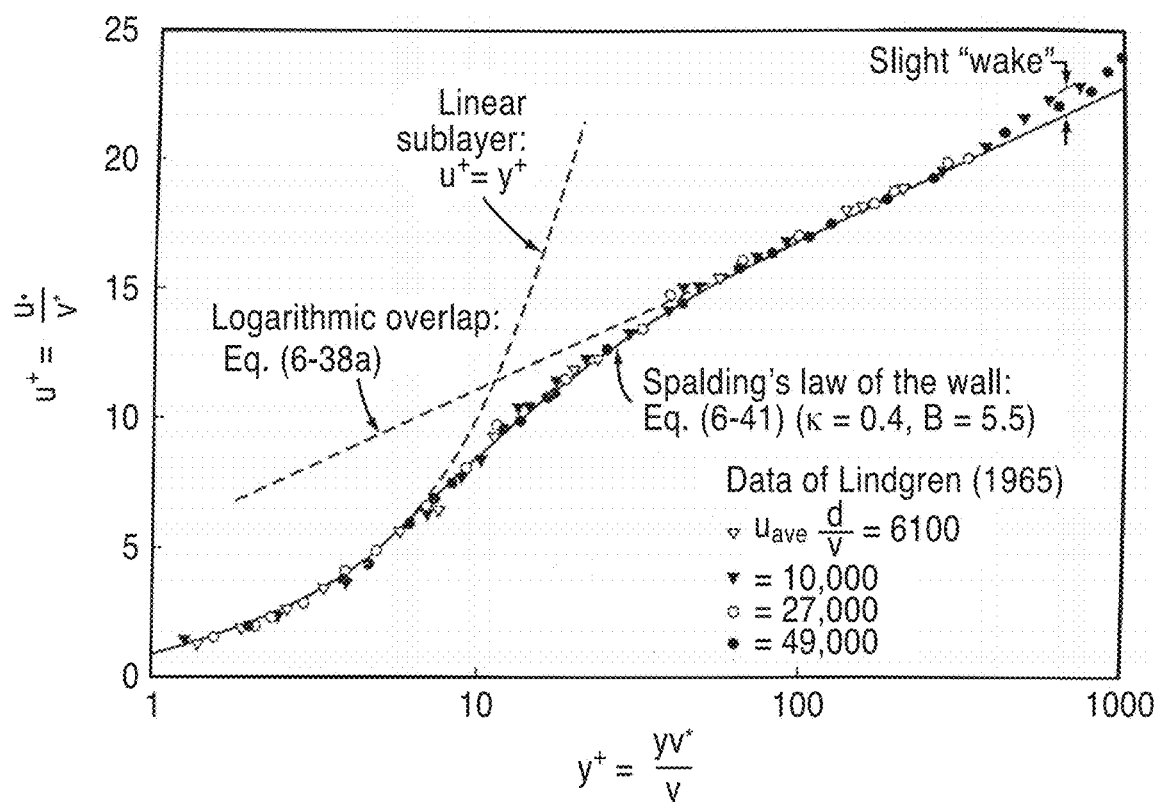
FIG. 9 shows plot of experimental data with respect to the three sublayers of FIG. 8.

The dimensionless parameter, $y^+$, is the distance from the wall. The variable A is a constant that is dependent on the local pressure gradient in Eq. 34b. The other two constants ($\kappa$ and B), are those for turbulent flow over walls that are nonporous and smooth. The laws discussed are depicted graphically in FIG. 9, which is compared to experimental data. In FIG. 9, the experimental data shows good agreement with the formulations for the three sublayers.

Very close to the wall, called the viscous sublayer, viscous shear dominates the boundary layer. At such low y values ($y^+ \leq 5$), the $u^+$ and $y^+$ parameters are equivalent as depicted in FIG. 9. Above the viscous sublayer is the buffer layer, for the $y^+$ range of 5-30. The layer is essentially a smooth connection between the linear sublayer and logarithmic overlap layer. The equation below connects the wall region:

$$y^+ = u^+ + \exp(-\kappa B)\left[\exp(\kappa u^+) - 1 - \kappa u^+ - \frac{(\kappa u^+)^2}{2} - \frac{(\kappa u^+)^3}{6}\right] \quad \text{Eq. 36}$$

The curve, along with the coefficients $\kappa$ and B, are shown in FIG. 9.

4.5.2 Resolving the Near-Wall Flow

There are two ways to resolve the flow near the wall: using wall functions or the "near-wall model" approach. The former uses formulas, such as law-of-the-wall, to "bridge" the fully turbulent flow with the viscous, near-wall flow. While perfectly suitable for high Re flows, the wall function approach does have severe limitations if large pressure gradients, including separated flow, are experienced.

The near-wall modeling approach fully resolves the flow up to the wall boundary. This is achieved by refining the mesh near the wall, allowing for what are called two-layer "enhanced wall functions" to be utilized.

For this study, the near-wall flow was fully resolved using the Enhanced Wall Treatment option in ANSYS Fluent. The need to avoid wall functions lies in the fact that the nozzle ramps 14, 16 will cause flow separation to various extents. As mentioned above, wall functions are not well suited for such scenarios. This choice also included accounting for various effects such as pressure gradients, thermal, compressibility, and curvature correction. The choice to fully resolve the flow calls for the determination of the spacing between the wall and first grid node ($\Delta Y_{wall}$). The wall spacing can be approximated by the inverse of the Reynolds number value.

$$\Delta Y_{wall} \cong Re_D^{-1} \quad \text{Eq. 37}$$

The characteristic length for the Re value, as will be explained in the following section, is the inlet diameter. Lastly, according to the descriptions in, the first node from the wall should be placed at a distance $y^+ \approx 1$.

5. Grid Generation

Grid specifications, such as wall spacing to final grid sizes, were also determined for the baseline and TVC subcases.

5.1 Obtaining $\Delta Y_{wall}$

One of the first steps in generating the grids for the series of simulations was to determine the spacing from the nozzle wall 12 to the first node. This required the Reynolds number, as a function of the inlet 22 diameter. To obtain $R_{eD}$, a series of calculations were carried out to obtain the three missing inlet parameters: density, velocity, and dynamic viscosity. The density was calculated using the ideal gas law, having obtained the static pressure and temperature from the isentropic relationships.

$$\rho_i = \frac{p_i}{Rg_cT_i} \quad \text{Eq. 38}$$

The velocity was yielded using the assumed inlet Mach number and definition for speed of sound.

$$v_i = (Ma \cdot \sqrt{\gamma Rg_cT})_i \quad \text{Eq. 39}$$

The parameter $g_c$ in the equations above is the gravitational constant (32.174-ft.lbm/lbf.s$^2$), required to convert mass units from lbm to slugs. The dynamic viscosity was calculated two ways (for comparison purposes): using the power law and Sutherland's formula.

$$\frac{\mu_i}{\mu_0} = \begin{cases} \left(\frac{T_i}{T_0}\right)^{0.7} \\ \left(\frac{T_i}{T_0}\right)^{1.5}\frac{(T_0 + S)}{(T_i + S)} \end{cases} \quad \text{Eq. 40}$$

The reference parameters above are the same ones shown in Table 9. Given the differences between the resulting two values (not shown) for $\mu_i$, the average was used in determining the inlet Reynolds number.

$$Re_{D_i} = \left(\frac{\rho VD}{\mu_{avg}}\right)_i \quad \text{Eq. 41}$$

The value for each inlet flow parameter is listed in Table 11, with the resulting $\Delta Y_{wall}$ value at the bottom.

While not pertinent in generating the grids, an additional parameter was calculated using the inlet Reynolds number: the turbulence intensity, a boundary condition input. The intensity can be approximated with the relationship below, which is the ratio of the root mean-square of the flow's velocity to the mean flow velocity.

$$I = 0.16 \cdot Re_D^{-1/8} \qquad \text{Eq. 42}$$

It should be noted that the formulation from uses the Reynolds number with the hydraulic diameter ($D_H$) as the characteristic length. Having maintained a circular inlet, however, the characteristic length was set as the nozzle's inlet diameter.

Figure 10:
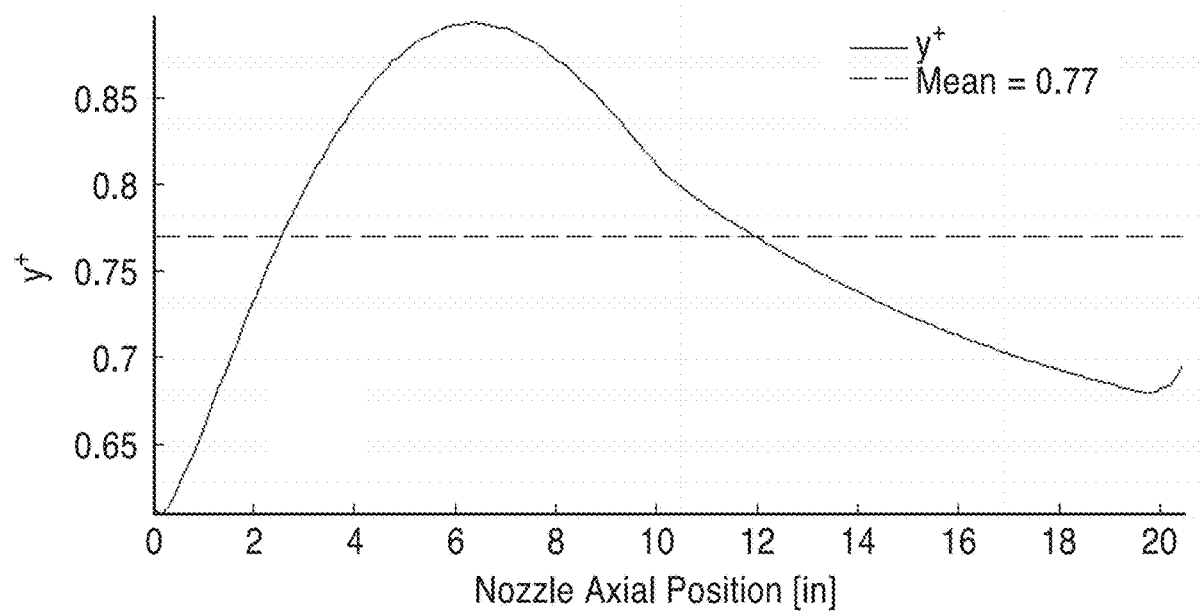

As previously mentioned, the first node from the wall should be placed at $y^+ \approx 1$. However, given the number of geometrical configurations, along with two inlet boundary settings, the same wall spacing was used for all grids (the smaller of the two). This was to streamline the overall simulation process, so as to not produce 36 different grids. With the selected $\Delta Y_{wall}$ value used in all grids, the $y^+$ distribution along the nozzle wall was examined following a viscous, nozzle-only trial. The resulting distribution is shown in FIG. 10, which shows the $y^+$ distribution along the nozzle wall associated with a wall spacing of $5 \times 10^{-4}$-in.

The average value is approximately 0.8, validating the choice to proceed with $5.0 \times 10^{-4}$ inches as the spacing between the wall and first node for all grids.

5.2 Full 2D Grid with Extended Domain

Figure 11:
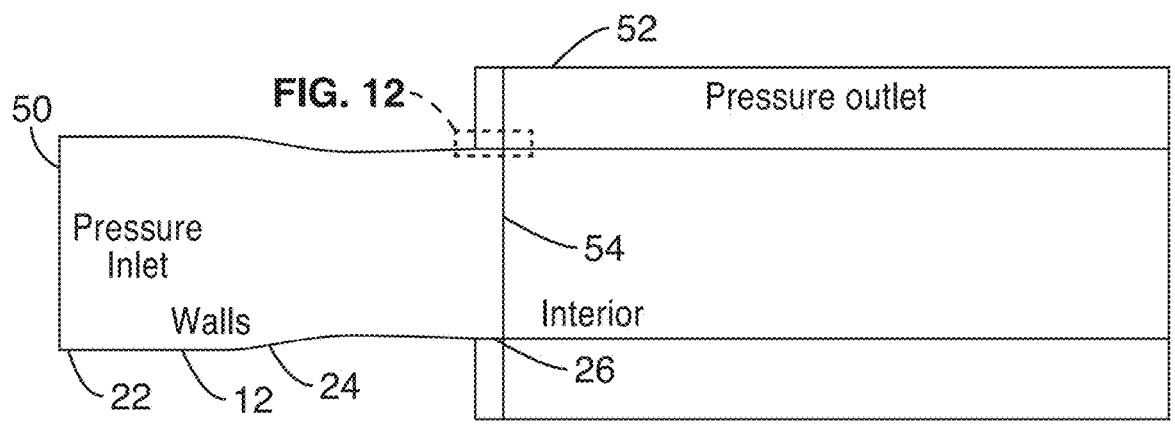
FIG. 11 is an outline of a baseline grid with corresponding boundaries.
Figure 13:
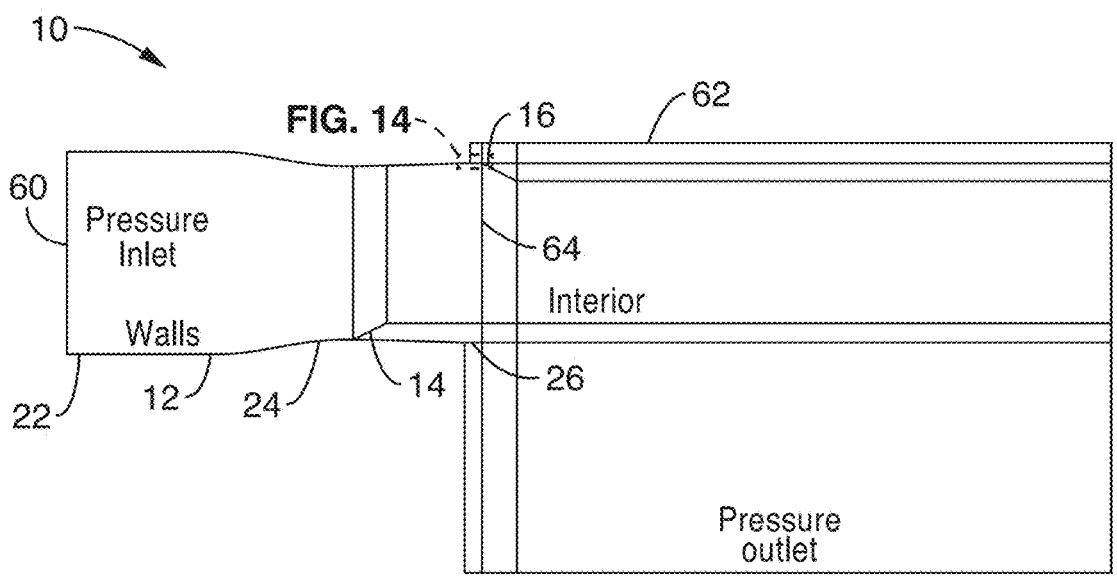
FIG. 13 is an outline of a grid for a sample vectoring configuration in accordance with the present description.

The grid was created using the 2D planar blocking capabilities of ANSYS ICEM. This allowed for control over various grid parameters, such as inflation, number of nodes per block edge, spacing, etc. As such, the entire domain was created in a structured-like manner, by splitting the domain into subdomains (see FIG. 11 and FIG. 13). FIG. 11 presents the outline of the baseline grid, with corresponding boundaries. FIG. 13 presents an outline of a grid for a sample vectoring configuration. The portion above the exit ramp was minimized due to the downward flow deflection.

5.2.1 Baseline

The domain for the 2D baseline case was created by extending the grid past the nozzle wall 12 in both x and y directions, as depicted below. By extending it in the x-direction, the exhaust flow and any shock phenomena can be captured. Similarly, the y-direction extension is to account for the mixing layers along the exhaust flow. As FIG. 11 shows, the "ambient" portion of the domain is also extended in the negative x-direction (behind the nozzle exit plane 54). This is typical for such simulations, and is to account for any recirculating flow above or below the nozzle wall 12 that crosses the nozzle exit plane 54.

Figure 12:
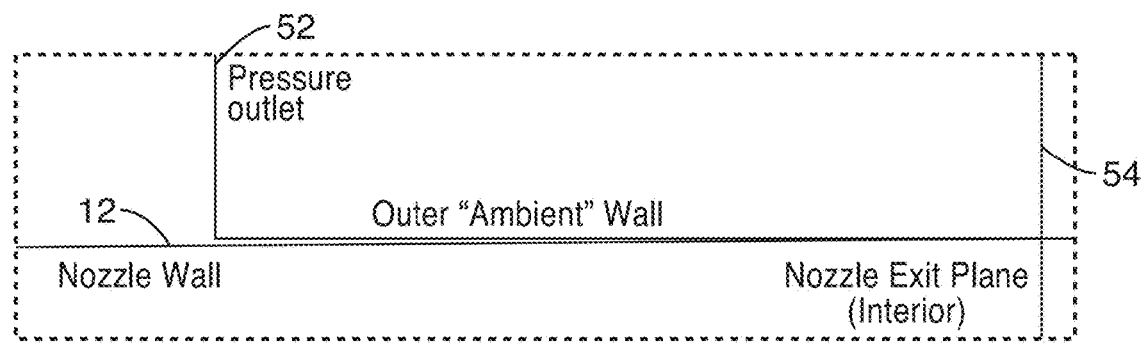
FIG. 12 shows a close-up view of the upper portion of the exit boundaries for the baseline grid of FIG. 11, showing the outer wall boundary.

Also shown in FIG. 11 are the selected boundary condition types for each block edge. The study at hand only called for a pressure inlet 50 and outlet 52 boundaries for the flow. All other boundaries in the grid were set to no-slip wall (nozzles walls 12) or interior conditions. FIG. 12 shows a closer view at the upper corner of the exit plane 54 to clearly show the boundaries in that area. The figure presents a closer view of the upper portion of the exit boundaries for the baseline grid, showing the outer wall boundary. The bottom edge of the extended domain behind the exit plane was given a wall boundary, as it can represent the outer surface the aircraft the engine is embedded in.

5.2.2 Deployed Ramps

By introducing the ramps 14,16, the full 2D domain had to be split into even more subdomains in order to achieve the multi-block, structured-like grid demonstrated in FIG. 13, which presents an outline of a grid for a sample vectoring configuration. FIG. 13 shows the corresponding pressure inlet boundary 60 and outlet boundaries 62 and nozzle exit plane 54. The portion above the exit ramp 16 was minimized due to the downward flow deflection.

Additionally, as the ramp angle increased, the domain had to be extended further in the negative y-direction to prevent the turbulent viscosity ratio reaching its limit of 10,000 near the bottom right corner of the grid. Initial simulations demonstrated that the warning in Fluent appeared if the exhaust flow struck said corner of the grid. The extensions in the negative y-direction were purely estimated based on the ramp angle.

Additionally, given that the ramps 14, 16 are configured for downward flow deflection, the upper portion of the extended domain was shortened, to remove unnecessary nodes.

Figure 14:
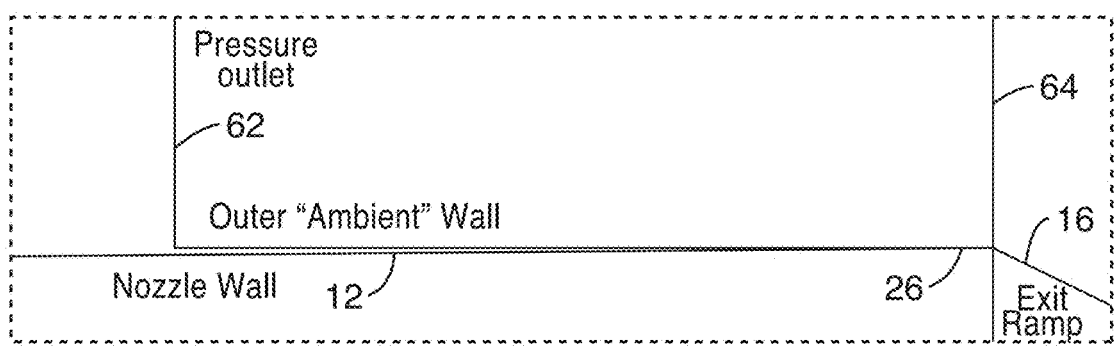
FIG. 14 shows a close-up view of the upper portion of the exit boundaries for the grid of FIG. 13.

A close-up view near the nozzle exit is presented in FIG. 14, which presents a similar outer grid outline as in the baseline case. The rearward extension was not necessary, as no flow was expected to recirculate towards that region.

With the exit ramp configured for downward flow deflection in the simulations, there was not much of a need for the outer wall at the top. For consistency, however, it was included in all grids.

5.3 Grid Size

For the baseline case, the grid was created by selecting a particular number of nodes per block edge such that a node spacing of approximately 0.125-in was achieved. This spacing was selected based on a preliminary inviscid simulation, in which the grid had to be refined in order to address a discrepancy in the total pressure contours (i.e. there was a gradient near the wall, implying non-constant total pressure). The final node spacing in this preliminary case was set to 0.125-in, which helped reduce the percent difference between the minimum and maximum values of the contour plot to <1%.

Figure 15:
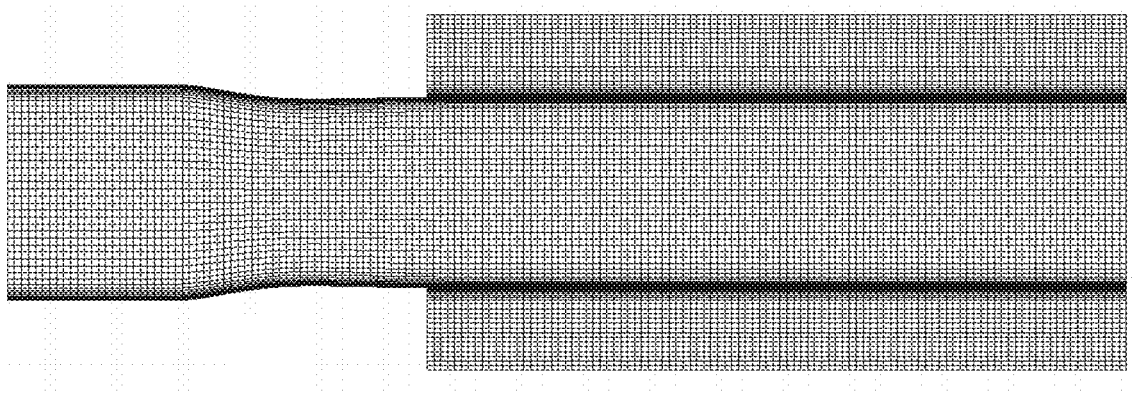

An inflation ratio of 1.3 was used for both the baseline and TVC grids (a ratio of 1.2 is typically used). This ratio determines the cell size growth rate, beginning with the first cell by the wall. The final grid size for the baseline case is 149,000 nodes. FIG. 15 shows the baseline grid with far fewer nodes to better demonstrate the structured nature of the grid. The figure shows the baseline grid with a lower cell count for visual clarity. In the actual grid, each cell had an approximate space of 0.125-in.

Considering the fact that the exhaust flow from the nozzle only affects a particular portion of the ambient domain, an unstructured grid could have been implemented in those unaffected sections (i.e. the vertically extended portions of the domain). Computational costs would have decreased, as the number of nodes would have been lower. With an acceptable solution obtained within 2,000 iterations, however, a structured grid was used for all the proceeding subcases.

Figure 16:
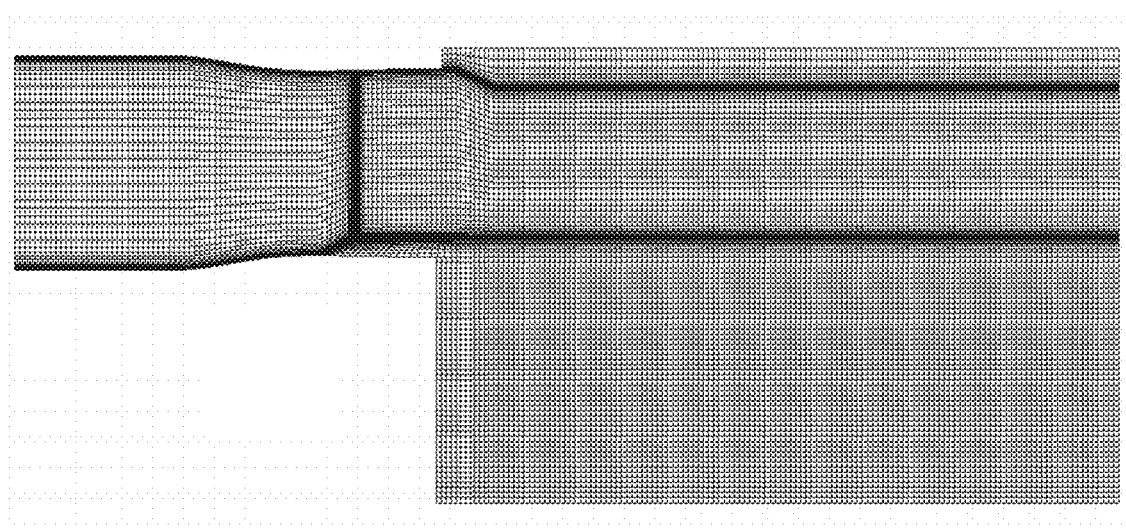
FIG. 16 shows an exemplary TVC configuration grid with a lower cell count for visual clarity. Skewing can be observed near the ramps, with the most skewed cells located in regions of recirculating flow.

FIG. 16 shows a sample TVC configuration grid with a lower cell count for visual clarity. Skewness can be observed near the ramps 14, 16, with the most skewed cells located in regions of recirculating flow.

As FIG. 16 shows, the ramps introduce skewness in grid cells near the ramps themselves. The most skewed cells, however, are in regions where separated flow will be witnessed (mainly downstream of the throat ramp 14). As such, the skewness is of low concern in the 18 generated grids. While the number of nodes exceeded 160,000 for all grids, acceptable solutions were obtained within 3,000 iterations.

Again, each block had a node spacing of approximately 0.125-in in the x-y directions. While somewhat arbitrary in choice, the element spacing value helped keep the aspect ratio of the first boundary layer cell in the order of $10^3$. ANSYS Fluent will give a warning when near-wall cells have an AR larger than 100, and in order to prevent that warning, the number of nodes per grid would need to be unnecessarily much greater than those shown in Table 12. A systematic approach in creating each grid resulted in grid sizes no larger than 210,000 nodes.

5.4 Boundary Condition Inputs

Stagnation conditions were used in defining the upstream pressure-based boundary, as outlined in Table 13. The initial guess for the inlet static pressure was set to the value from Table 11, rounded to nearest integer. For the outlet boundary, the gauge pressure was set to sea-level. A non-zero value was used due to the definition of operating pressure within Fluent. The pressure outlet boundary also calls for a "backflow total temperature". The value corresponds to the total temperature of any flow that returns into the domain across the boundary (i.e. recirculating or reverse flow). Given that the ambient portion of the domain is set to sea-level conditions, the backflow total temperature was then set to that of a standard day at sea-level. Lastly, the default turbulence intensity was used.

As Table 13 shows, the investigation considers two sets of inlet boundary parameters. The number next to boundary condition, such as non-afterburner, represents the case number. As such, a given subcase identifier (from Table 6) will have a case number prefix (e.g. ramp length of 1.5-in at 25° with afterburner inlet boundary parameters will be referred to as subcase 2-1b).

6. Results and Discussion

With the exception of the nozzle geometry validation results, this section presents the numerical data from Fluent for both the baseline and TVC cases. For the latter, node-center data from the exit plane was reduced to evaluate vectoring performance. It should also be noted that the ramp angle and length of the lower and upper ramps were kept the same in each configuration. Variations of these parameters and their effects on thrust vectoring could be considered in the future to optimize the mechanism design.

6.1 Baseline Data

Figure 17A:
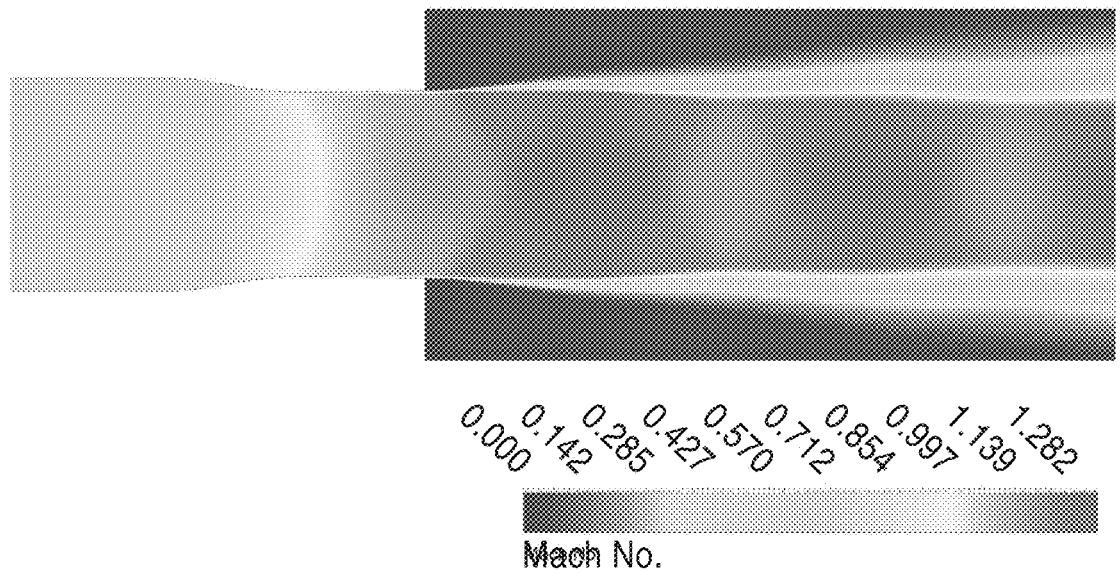
FIG. 17A and FIG. 17B show mach contours and static pressure contours, respectively, for the baseline case.
Figure 17B:
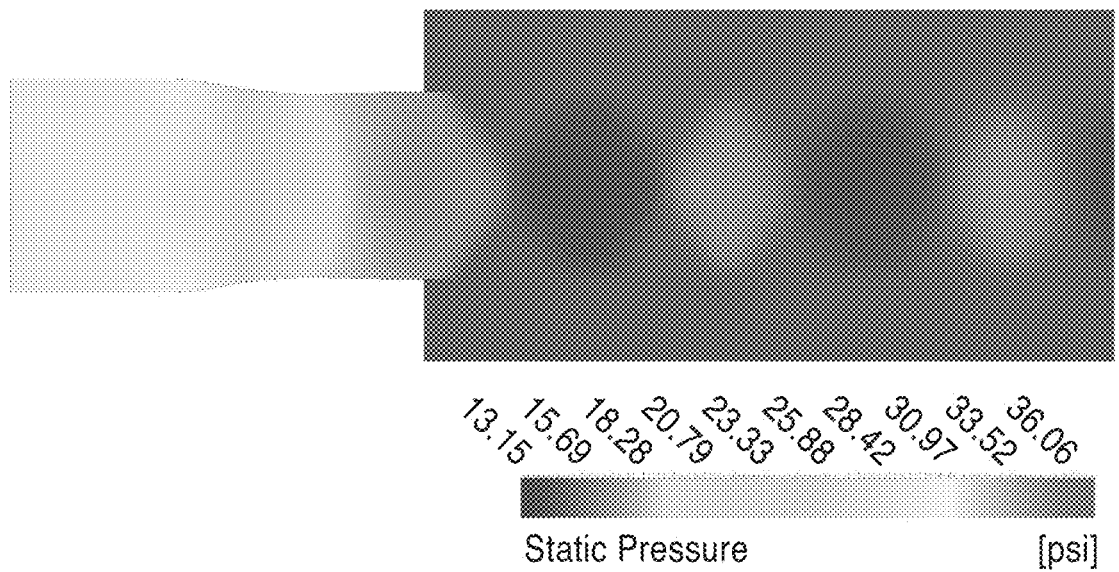

FIG. 17A and FIG. 17B show mach contours (FIG. 17A) and static pressure contours (FIG. 17B) for the baseline case. The presence of shock diamonds, along with the color bar values, shows that the flow does not perfectly expand as expected.

As depicted in FIG. 17A and FIG. 17B, the flow does not perfectly expand at the nozzle's exit. When the full 2D domain is considered (as opposed to the axis-symmetric validation case), the flow is shown to be under-expanded, leading to the observed decrease in exit Mach number. Additionally, while the flow still chokes at the nozzle throat, there is an approximate 20% increase in the nozzle inlet Mach number, resulting in a decrease in static pressure (as total pressure remains constant).

Regardless of the cause for the data above, the results for the under-expanded flow behave accordingly. That is, the observed diamond shocks get weaker further away from the nozzle.

6.2 Thrust Vectoring Data

FIG. 18A through FIG. 23B present the Mach and static pressure contours, grouped by ramp angle value. Each row of contour plots presents the data for a given $L_r$ value, in ascending order. Contour plots were also generated for two nozzle inlet conditions: Case #1 (shown in FIG. 18A, FIG. 19A, FIG. 20A, FIG. 21A, FIG. 22A, FIG. 23A), and Case #2 (shown in FIG. 18B, FIG. 19B, FIG. 20B, FIG. 21B, FIG. 22B, FIG. 23B).

Figures 18A, 18B:
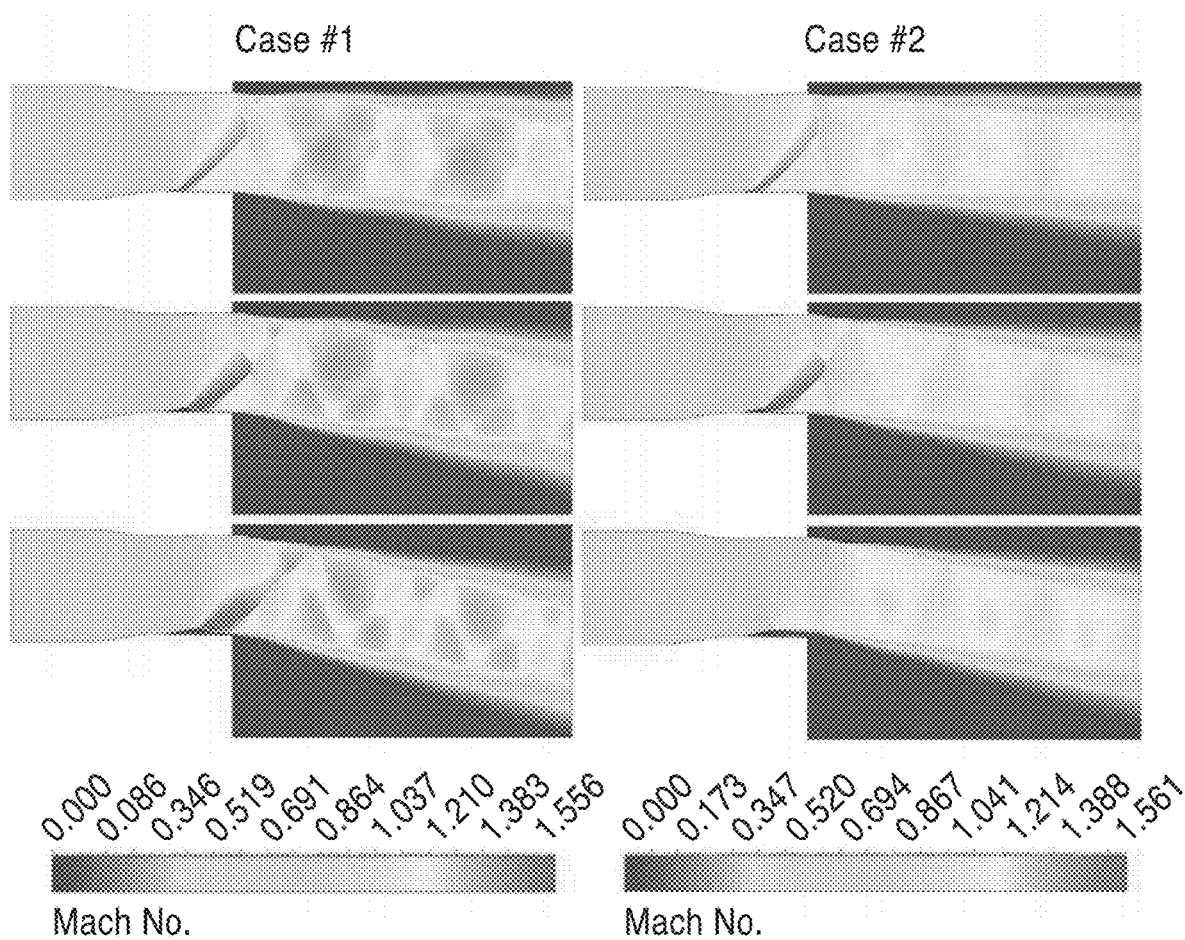
FIG. 18A and FIG. 18B show mach contours for all ramp lengths at 10°, and both inlet boundary conditions.

FIG. 18A and FIG. 18B show mach contours for all ramp lengths at 10°, and both inlet boundary conditions. The contour results for subcases 1-1a through 1-1c in Figure FIG. 18A and FIG. 18B show highly complex shock structures in the exhaust flow. Focusing specifically on subcase 1-1a and comparing it to 2-1a, weak shock diamonds can be observed in the former's contour plots. As the ramp length increases at the constant 10° for case 1, the shock structures become disorderly. For example, the shock diamonds in subcase 1-1a are no longer apparent in subcase 1-1c. A somewhat skewed sonic line in subcase 1-1c, however, can be noticed near the exit, just before the oblique shockwave. While the shock structures in case 2 are more or less consistent, and are comparable just upstream of the exit plane to the results for 1-1a and 1-1b, there is a lack of a strong oblique shockwave for subcase 2-1c. Additionally, subcase 2-1c also lacks a skewed sonic line.

It is also worth noting that the short ramp length leads to minimal flow separation on the downstream side of the throat ramp 14. This causes minimal streamline curvature past the throat ramp lip. Consequently, the low flow deflections in subcases 1-1a, 1-1b, 2-1a, and 2-1b are likely due to the minute shock impingements at the lower nozzle wall exit lip. Only the exit plane flow in subcases 1-1c and 2-1c have notable clearances from the lower wall lip.

Figures 19A, 19B:
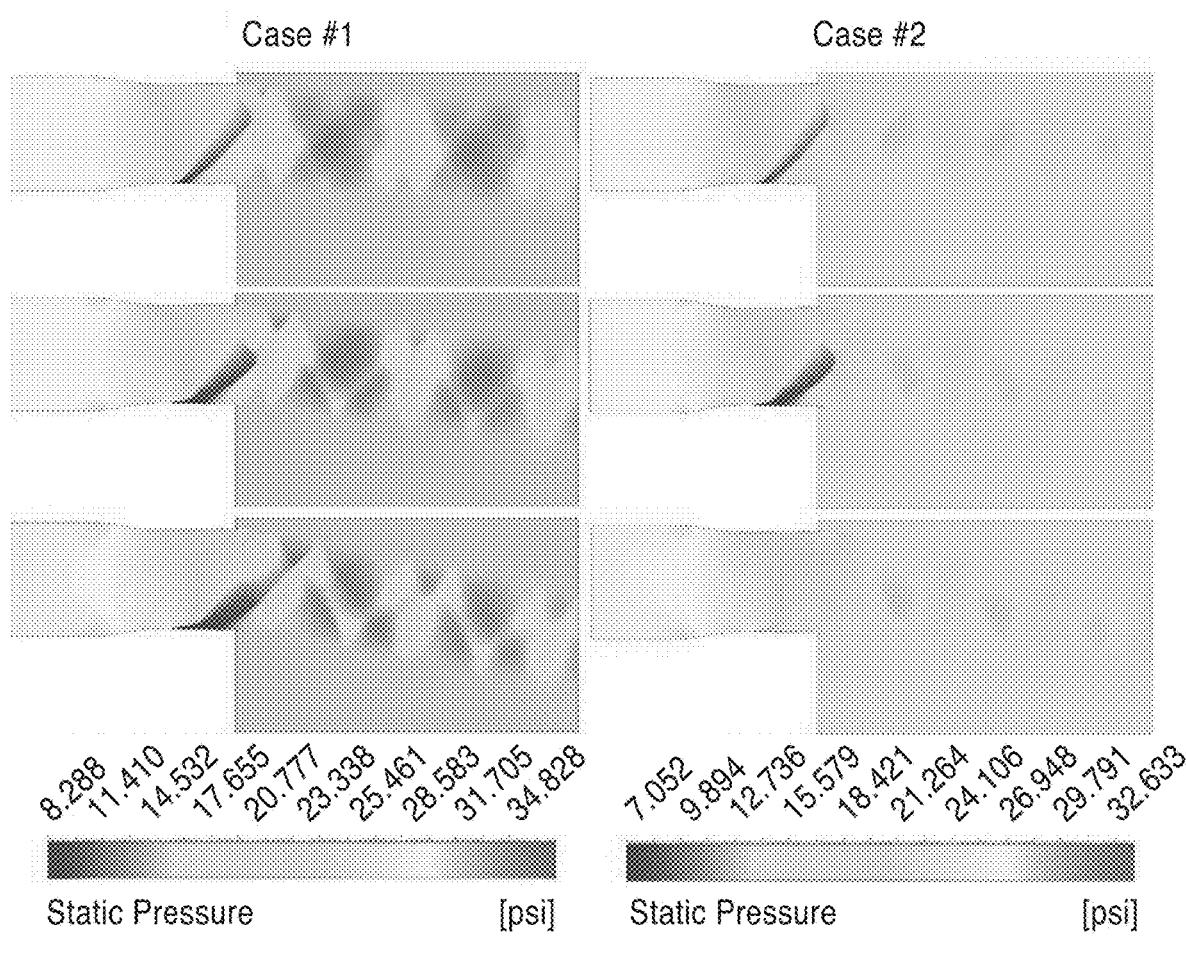
FIG. 19A and FIG. 19B show static pressure contours for all ramp lengths at 10° and both inlet boundary conditions.

FIG. 19A and FIG. 19B static pressure contours for all ramp lengths at 10° and both inlet boundary conditions. The static pressure contours in FIG. 19A and FIG. 19B compliment the observations from FIG. 18A and FIG. 18B, in the sense that the afterburner inlet conditions yield weaker changes across the successive shocks in the case 2 contours. The case 2 contour plots in FIG. 19B show that the pressure downstream of the shock features are somewhat comparable to the ambient pressure of 14.7-psi.

Figure 20A:
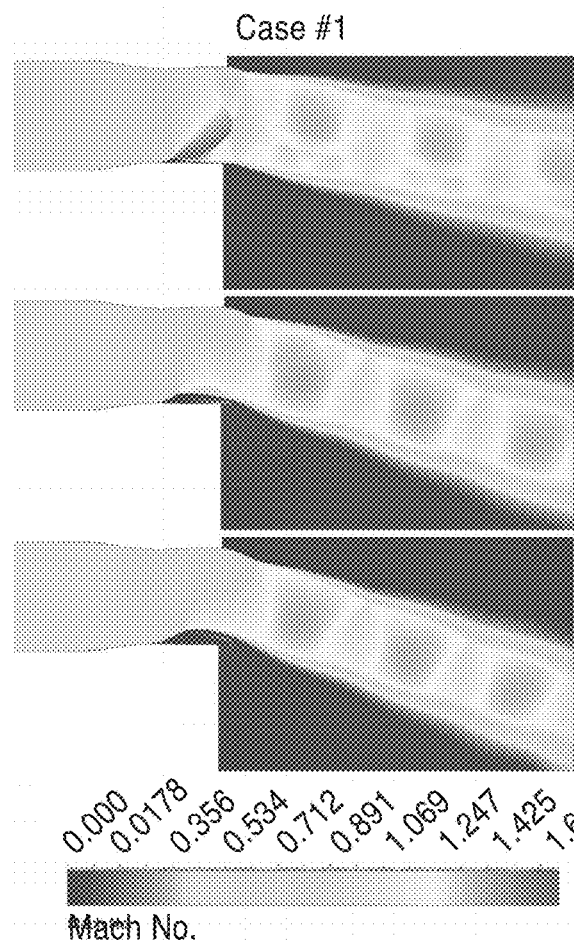
FIG. 20A and FIG. 20B show mach contours for all ramp lengths at 25° and both inlet boundary conditions.
Figure 20B:
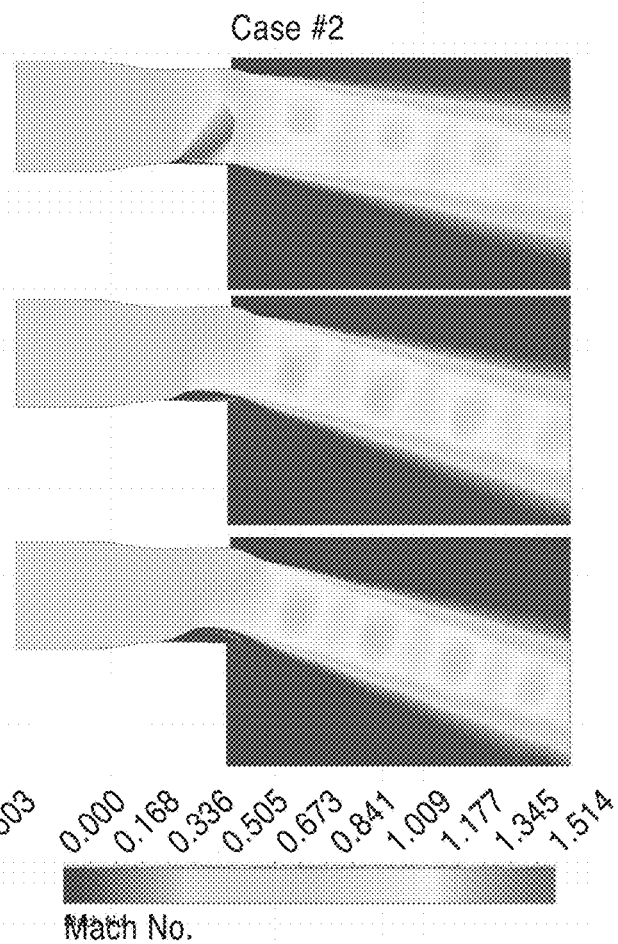
Figures 21A, 21B:
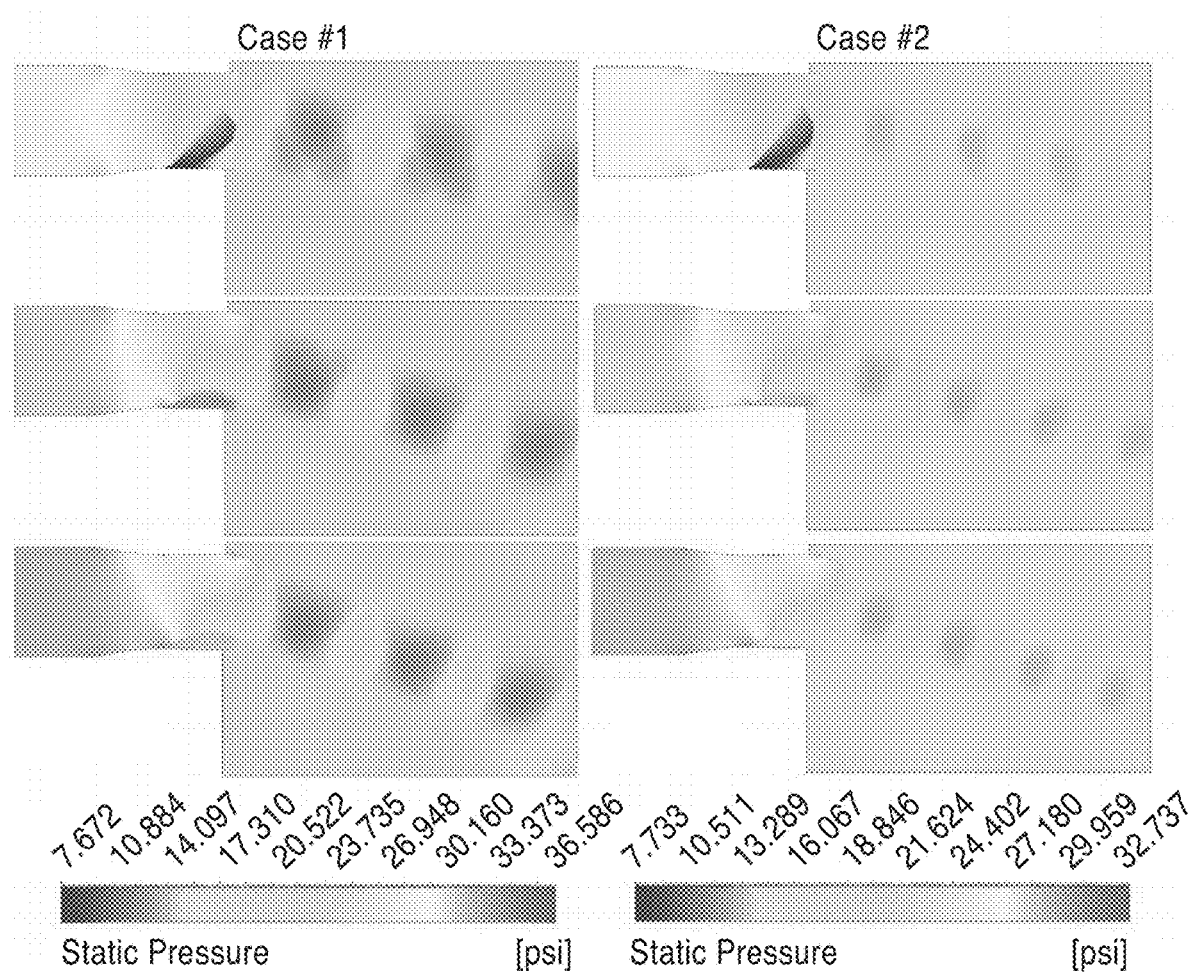
FIG. 21A and FIG. 21B show static pressure contours for all ramp lengths at 25° and both inlet boundary conditions.

FIG. 20A and FIG. 20B show mach contours for all ramp lengths at 25° and both inlet boundary conditions. FIG. 21A and FIG. 21B show static pressure contours for all ramp lengths at 25° and both inlet boundary conditions. For the ramp angle of 25°, the shock structures in FIG. 21A and FIG. 21B are more distinguishable for both cases. Only in subcases 1-2a and 2-2a are strong oblique shockwaves observed. Moreover, in subcase 2-2a, there is an apparent normal shockwave that is nearly parallel to the exit plane. For subcases 1-2b, 1-2c, 2-2b, and 2-2c, the region of separated flow downstream of the throat ramp is more apparent. Additionally, while the flow at the exit plane clearly does not impinge the lower wall lip in those four subcases, there is distinguishable recirculating flow that spills out of the nozzle. This is one observable feature of unsteadiness that warrants time-dependent solutions.

While hard to distinguish in FIG. 20A and FIG. 20B, there is a skewing of the flow near the exit for intermediate and high ramp length subcases. This feature, however, is more noticeable in the pressure contour plots.

Similar to the static pressure contours of FIG. 19B, the contours in FIG. 20B again demonstrate the smaller pressure drops across the shock features for the $2^{nd}$ case. As the ramp angle increases, though, the changes in pressure across such features for case 2 do increase.

The distorted band near the exits for the latter four subcases demonstrates the skewed flow previously mentioned. Additionally, at the base of either ramp, there are regions of increased pressure—which was expected. As the ramp angle increases, the ramp becomes more of an obstacle for the incoming flow, creating an adverse pressure gradient.

Figure 22A:
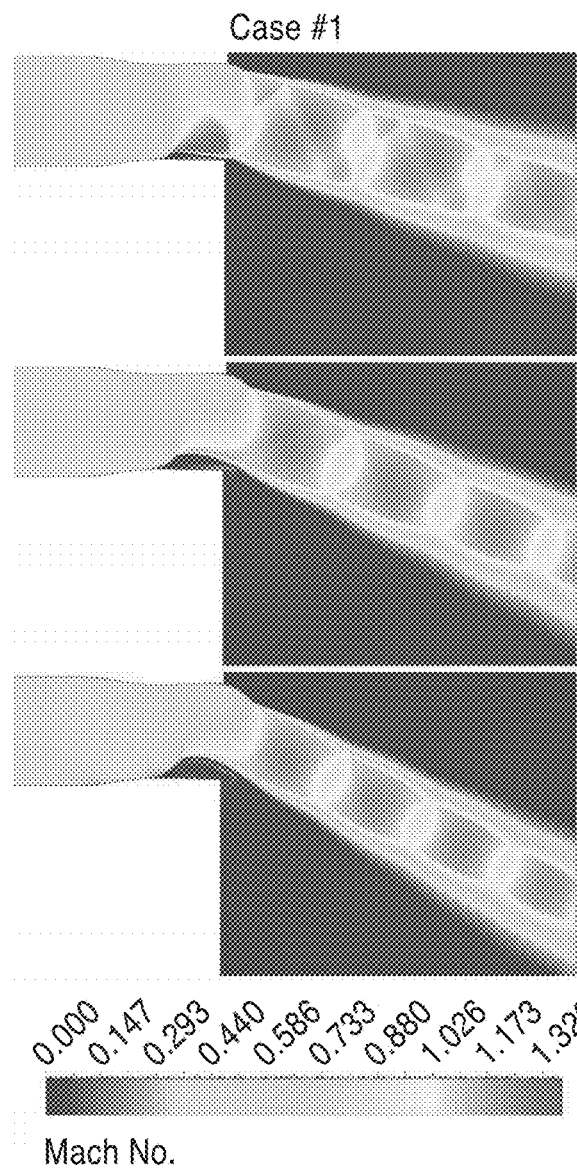
FIG. 22A and FIG. 22B show mach contours for all ramp lengths at 40° and both inlet boundary conditions.
Figure 22B:
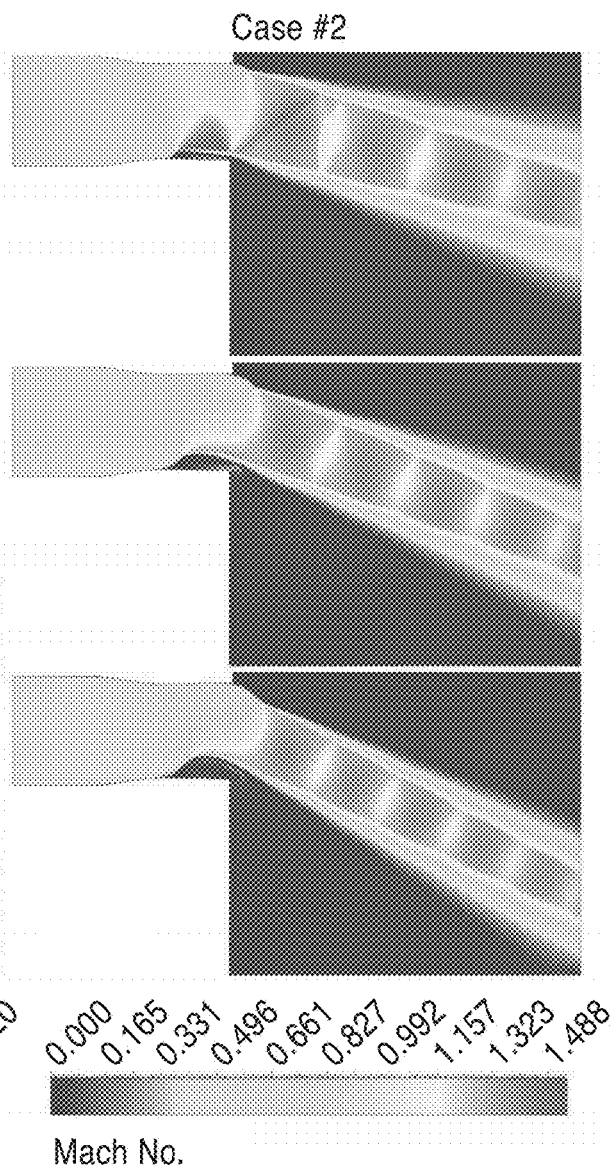

FIG. 22A and FIG. 22B show mach contours for all ramp lengths at 40° and both inlet boundary conditions. The Mach contours in FIG. 22A and FIG. 22B most clearly show a skewed sonic line near the nozzle exit. In subcases 1-3a and 2-3a, though, there are bubbles of supersonic flow with Mach numbers in the excess of 1.25 just downstream of the throat ramp. This leads to additional shock features downstream at the exit, producing the observed shock structures in the exhaust flow, such as the reflected oblique shockwaves for subcase 1-3a. The oblique shockwave at the exit for subcase 2-3a produces a reflected shock on the opposite side of the exhaust core flow, but does not continue reflecting as in subcase 1-3a.

The skewed sonic line is most apparent in the latter four configurations, which crosses the exit plane by a finite amount. The two main differences between cases 1 and 2 are the shock features and core flow width, the latter being affected by the increasing parameter of $L_r$. Additionally, the recirculating flow downstream of the throat ramp spilling out of the nozzle is more obvious.

Figures 23A, 23B:
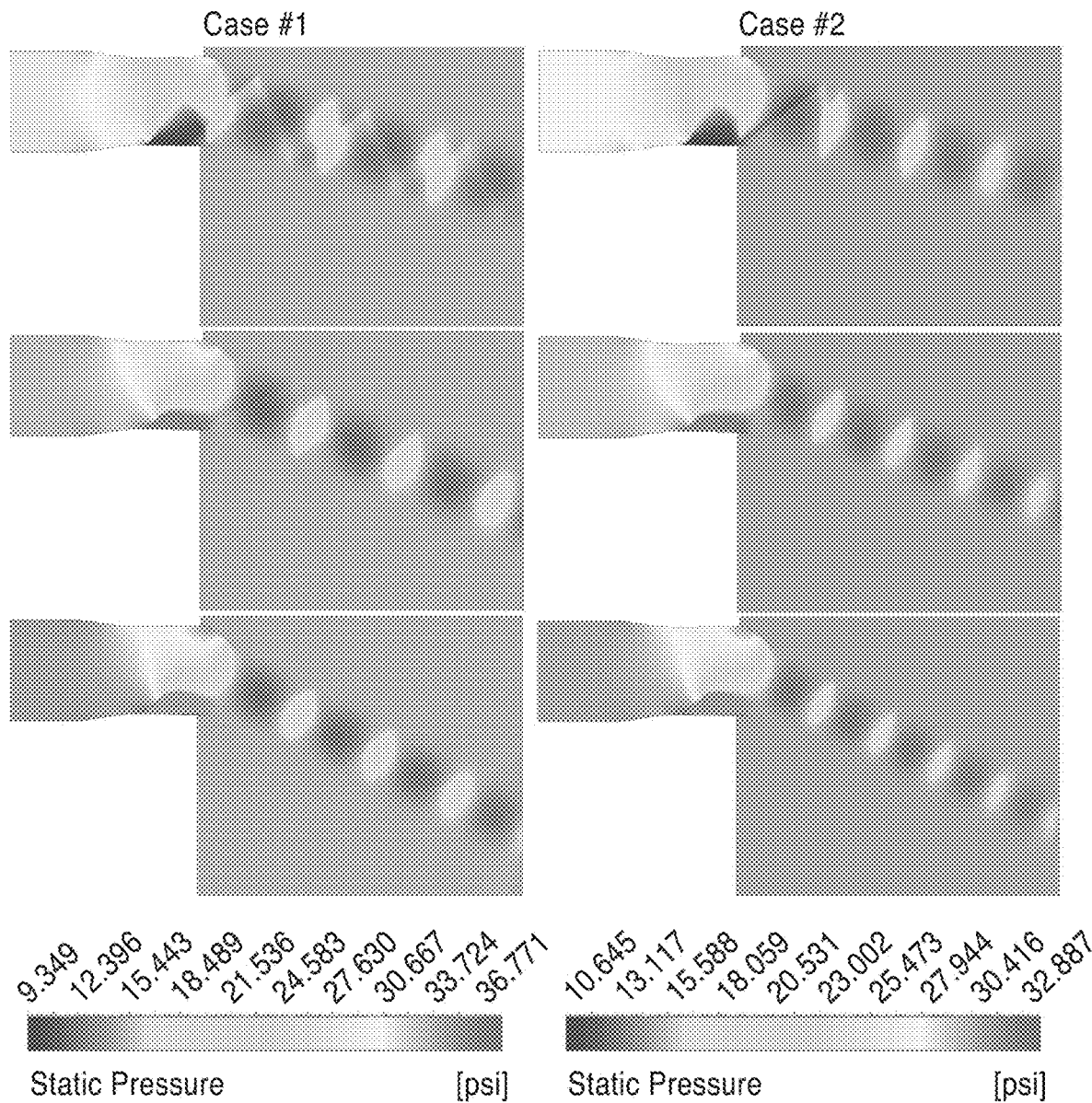
FIG. 23A and FIG. 23B show static pressure contours for all ramp lengths at 40° and both inlet boundary conditions.

FIG. 23A and FIG. 23B show static pressure contours for all ramp lengths at 40° and both inlet boundary conditions. The static pressure contours in FIG. 23B show that the case 2 pressure changes across the exhaust flow shock features are now more comparable to the case 1 results.

The adverse pressure gradients at the base of both ramps are also more apparent in FIG. 23A and FIG. 23B. It is then reasonable to expect even larger values of static pressure near those regions at even greater θ values.

One observation that is not readily clear in the pressure contours in FIG. 19A and FIG. 19B, FIG. 21A and FIG. 21B, and FIG. 23A and FIG. 23B is a gradual increase in pressure near the nozzle inlet with increasing θ values. This can be shown by taking the facet average of the static pressure across the nozzle inlet boundary.

Figure 24A:
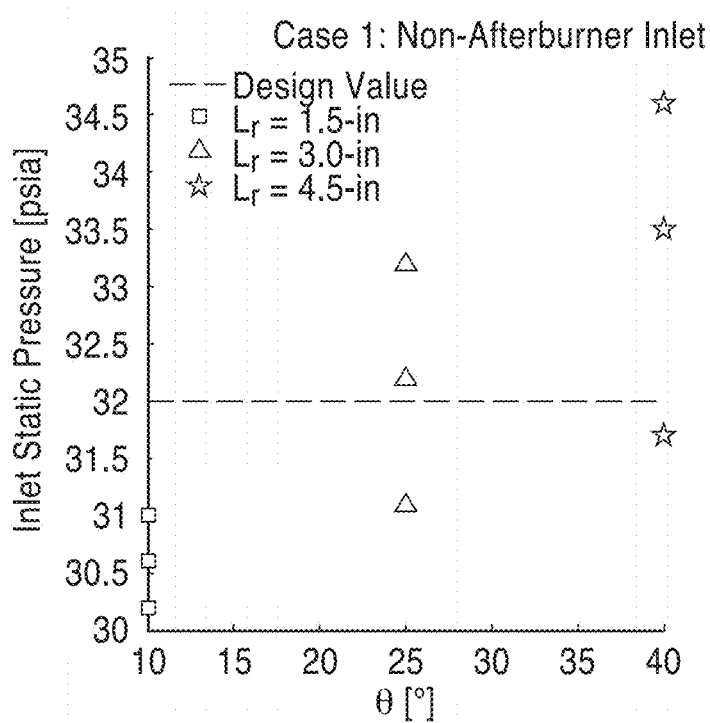
FIG. 24A and FIG. 24B show facet averages of static pressure at the nozzle inlet boundary for case 1 and case 2, respectively.
Figure 24B:
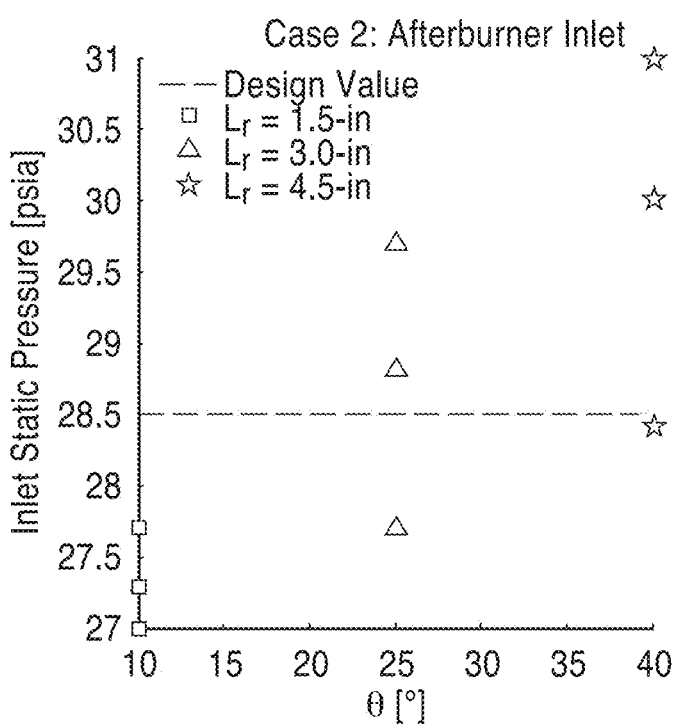

FIG. 24A and FIG. 24B show facet averages of static pressure at the nozzle inlet boundary for case 1 (FIG. 24A) and case 2 (FIG. 24B). The figure shows these averages plotted against ramp angle for both cases, and compares the values to the respective inlet static pressure design values. The increase in static pressure indicates a corresponding decrease of the inlet Mach number, resulting in lower mass flow rate. As the ramp length and angle increases, the flow area decreases, increasing the flow blockage, leading to the lower flow rate values (not shown).

It is clear that for the intermediate and high values of $L_r$, the inlet static pressure exceeding a corresponding design value becomes an issue for θ≥25°. This could be an issue for a fully integrated system, that is, if TVC mechanism was installed on a turbojet or mixed-flow turbofan engine. Specifically, an increase in pressure at the nozzle inlet could lead to upstream issues at the turbine. Due to these findings, it is seemingly warranted to implement the proposed TVC mechanism in a variable-area nozzle.

For each case, the average of the flow deflection angle (δ) was calculated at the exit plane of the second ramp. The $δ_{avg}$ values in Table 14 are in fair agreement with the ψ values shown in Table 7.

Figure 25:
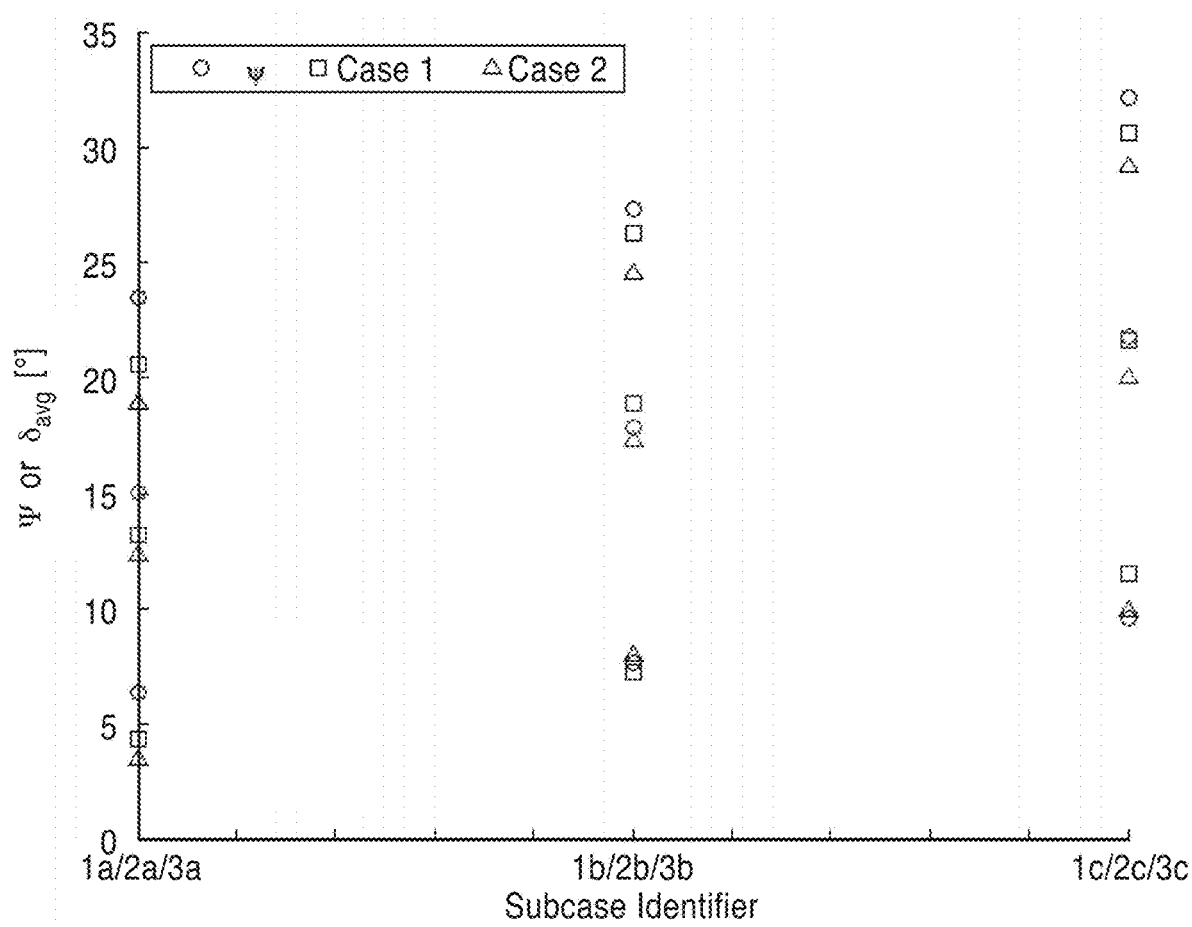
FIG. 25 shows a plot of mean flow deflection angle of all configurations in comparison with the calculated averages of θ and α.

FIG. 25 shows the mean flow deflection angle of all configurations are plotted in comparison with the calculated averages of θ and α. To visualize how the resulting $δ_{avg}$ values compare to the ψ values in Table 7, all values were plotted, shown in FIG. 25. With the tabulated and graphical data, it is clear that the afterburning inlet conditions (case 2) yields slightly inferior thrust vectoring performance.

Additionally, FIG. 25 shows that the mean flow deflection angle is approximately equal to the average of the geometric angles of the ramps (θ and α). Consequently, for any given geometric configuration, even at larger θ values not considered in this investigation, a thrust vectoring angle can be estimated by determining the value of ψ for that configuration.

Figure 26A:
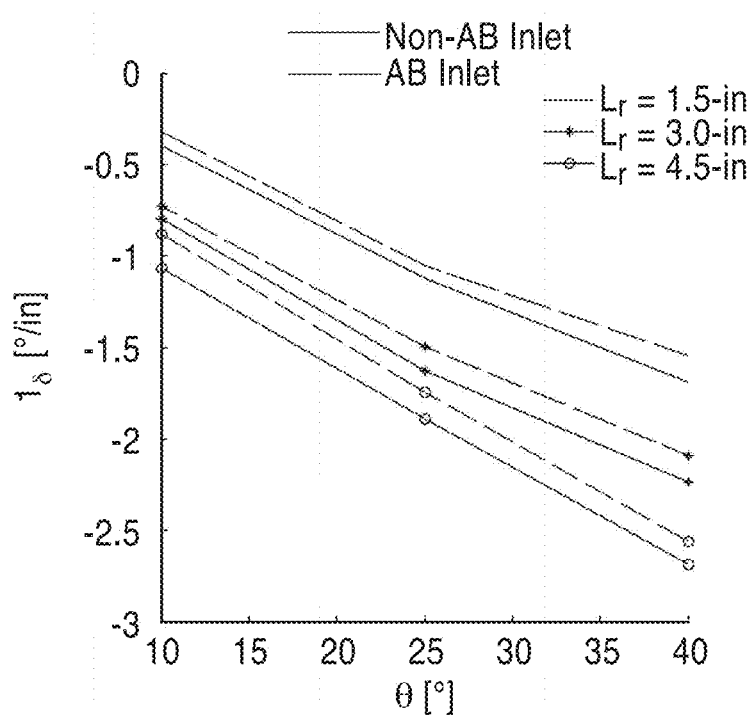
FIG. 26A and FIG. 26B are plots of the area-weighted integrals vs. ramp angle and ramp length, respectively. Superior thrust vectoring by the non-afterburning conditions is further demonstrated.
Figure 26B:
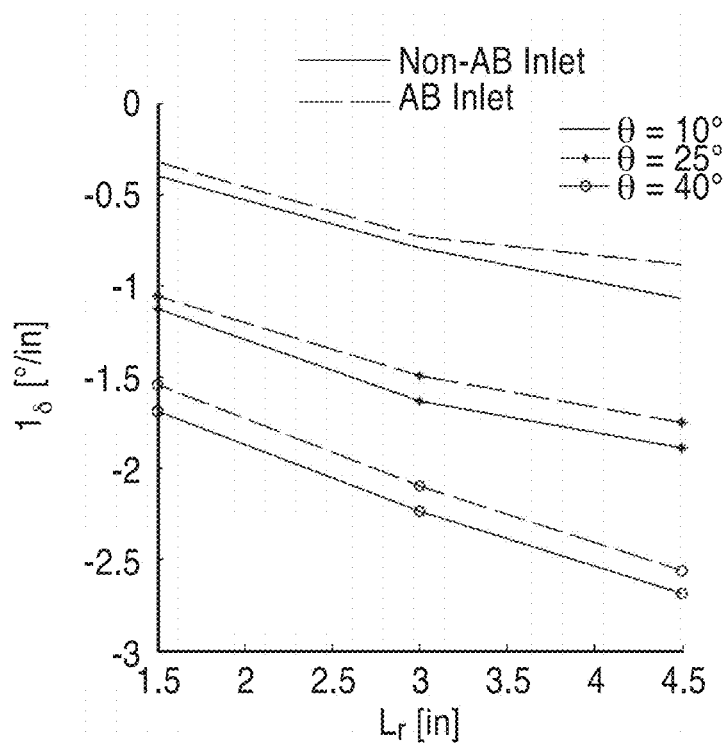

FIG. 26A and FIG. 26B show the area-weighted integrals plotted against ramp angle (FIG. 26A) and ramp length (FIG. 26B). The figure presents the area-weighted integrals of the δ distribution curves from the exit plane. The values are plotted separately against $L_r$ and θ, to have a better understanding of how the parameters affect the vectoring performance. The case 1 data sets are plotted in black lines and case 2 results in blue.

Slightly superior thrust vectoring by the non-afterburning conditions is further demonstrated.

The notion that utilizing the ramps without the engine's afterburner engaged yields superior vectoring performance is further demonstrated in FIG. 26A and FIG. 26B, which are plots of the area-weighted integrals vs. ramp angle and ramp length, respectively. When plotted against the ramp angle, the curve trend logically suggests that the flow can be further deflected at larger θ values. Plotting the integral values against $L_r$, on the other hand, shows the data trending towards a constant value for each θ value. It is this trend that could likely lead to an optimal ramp length in the future.

7. Conclusion

The numerical analyses conducted on the thrust vectoring mechanism of the present description show promise for performance capabilities. Estimating the expected flow deflection angle is a simple matter of determining the average value of two geometric angles, one of which is the ramp angle (θ). While the exhaust flow can be deflected a considerable amount with or without the engine's afterburner, superior vectoring performance was observed without reheating the flow via an afterburner. There was the observed issue of rises in static pressure at the nozzle inlet with increasing ramp angle. The issue was more pronounced for the intermediate and high ramp lengths, which is a cause for concern as those parameter values yield higher mean flow deflection angles. The concern lies within the potential for the engine's turbine to be negatively affected by the spikes in pressure or reduced mass flow due to the reduction in flow area, resulting from the deflection. To account for this, the TVC mechanism of the present description may be implemented within a variable-area nozzle, which could compensate changes in pressure or mass flow rate.

Furthermore, non-equivalent ramp parameters (e.g. variations in ramp length and ramp angle, may be adjusted or varied to optimize various configurations. Additionally, a time-dependent solution for at least one of the configurations may also be produced to account for unsteadiness observed in the solution residuals. In order to analyze how large the ramp angle (θ) can be, for one or both ramps, time-dependent analyses may be even more beneficial.

From the description herein, it will be appreciated that that the present disclosure encompasses multiple embodiments which include, but are not limited to, the following:

1. An apparatus for vectoring thrust of a air-breathing engine comprising a nozzle having an inlet, exit, and a throat, disposed between the inlet and exit, the apparatus comprising: first and second deployable ramps; wherein the first ramp is disposed on an internal wall of the nozzle at or near the throat; wherein the second ramp is and the positioned at or near the exit of the nozzle; and wherein the first and second ramps are configured to redirect exhaust flow of the nozzle.

2. The apparatus of any preceding embodiment, wherein the first and second ramps are asymmetrically staggered.

3. The apparatus of any preceding embodiment, wherein the engine comprises a supersonic engine, and the nozzle comprises a converging section comprising the throat and a diverging section leading to the exit.

4. The apparatus of any preceding embodiment, wherein the first and second ramps each have deployed states and un-deployed states; wherein the exhaust flow is axial when the first and second ramps are in the un-deployed state; and wherein the exhaust flow is redirected to a non-axial condition when the first and second ramps are in the deployed state.

5. The apparatus of any preceding embodiment: wherein the nozzle comprises a nozzle axis and exhaust flow comprises a sonic line; and wherein the sonic line is skewed off-axis with the nozzle axis to vector thrust from the engine.

6. The apparatus of any preceding embodiment: wherein the first ramp is configured to separate axial flow entering from the inlet; and wherein the second ramp is configured to direct re-attaching airflow at the exit to an off-axis condition.

7. The apparatus of any preceding embodiment, wherein at least one of the first and second ramps comprise a flap pivoting about a hinge from the non-deployed state to the deployed state.

8. A thrust-vectored, air-breathing engine, comprising: a nozzle having an inlet, exit, and a throat, disposed between the inlet and exit, the apparatus comprising: first and second deployable ramps; wherein the first ramp is disposed on an internal wall of the nozzle at or near the throat; wherein the second ramp is and the positioned at or near the exit of the nozzle; and wherein the first and second ramps are configured to redirect exhaust flow of the nozzle.

9. The engine of any preceding embodiment, wherein the first and second ramps are asymmetrically staggered.

10. The engine of any preceding embodiment, wherein the engine comprises a supersonic engine, and the nozzle comprises a converging section comprising the throat and a diverging section leading to the exit.

11. The engine of any preceding embodiment, wherein the first and second ramps each have deployed states and un-deployed states; wherein the exhaust flow is axial when the first and second ramps are in the un-deployed state; and wherein the exhaust flow is redirected to a non-axial condition when the first and second ramps are in the deployed state.

12. The engine of any preceding embodiment: wherein the nozzle comprises a nozzle axis and exhaust flow comprises a sonic line; and wherein the sonic line is skewed off-axis with the nozzle axis to vector thrust from the engine.

13. The engine of any preceding embodiment: wherein the first ramp is configured to separate axial flow entering from the inlet; and wherein the second ramp is configured to direct re-attaching airflow at the exit to an off-axis condition.

14. The engine of any preceding embodiment, wherein at least one of the first and second ramps comprise a flap pivoting about a hinge from the non-deployed state to the deployed state.

15. A method for vectoring thrust of a air-breathing engine comprising a nozzle having an inlet, exit, and a throat, disposed between the inlet and exit, the method comprising: deploying first and second deployable ramps within the nozzle; wherein the first ramp is disposed on an internal wall of the nozzle at or near the throat; wherein the second ramp is and the positioned at or near the exit of the nozzle; and redirecting an exhaust flow of the nozzle.

16. The method of any preceding embodiment, wherein the first and second ramps are asymmetrically staggered.

17. The method of any preceding embodiment, wherein the engine comprises a supersonic engine, and the nozzle comprises a converging section comprising the throat and a diverging section leading to the exit.

18. The method of any preceding embodiment, wherein the first and second ramps each have deployed states and un-deployed states; wherein the exhaust flow is axial when the first and second ramps are in the un-deployed state; and wherein redirecting the exhaust flow comprises directing the exhaust flow to a non-axial condition by activating the first and second ramps to the deployed state.

19. The method of any preceding embodiment: wherein the nozzle comprises a nozzle axis and exhaust flow comprises a sonic line; and wherein redirecting the exhaust flow comprises skewing the sonic line off-axis with the nozzle axis to vector thrust from the engine.

20. The method any preceding embodiment: wherein deploying first and second deployable ramps comprises deploying the first ramp to separate axial flow entering from the inlet and deploying the second ramp to direct re-attaching airflow at the exit to an off-axis condition.

21. The method of any preceding embodiment, wherein at least one of the first and second ramps comprise a flap pivoting about a hinge from the non-deployed state to the deployed state.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE A

Defined Variables

| Variable | Definition |
| --- | --- |
| A, A* | Area; critical nozzle area; coefficient |
| B | Coefficient |
| C | Coefficient |
| D, $D_h$ | Diameter; Hydraulic diameter |
| E | Total energy of flow |
| H | Total enthalpy of flow |
| I | Area-weighted integral; Turbulence intensity |
| J | Mass flux matrix |
| L | Ramp length; laminar |
| Ma | Mach number |

TABLE A-continued

Defined Variables

| Variable | Definition |
| --- | --- |
| Pr | Prandtl number |
| Q | Arbitrary flow property |
| R | Gas constant; residual vector |
| Re | Reynolds number |
| S | Spline value; effective temperature; mean strain rate; source term |
| T | Time scale; temperature |
| U | Freestream velocity |
| V | Velocity vector |
| W | Flow property gradient weight |
| Y | y-coordinate of exit plane boundary at second ramp |
| a, b, d | Spline coefficients |
| c, $c_p$ | Cell identifier; specific heat capacity at constant pressure |
| e | Spline coefficient; specific internal energy; nozzle exit |
| f | Arbitrary function; cell face |
| g | Arbitrary function; gravity constant |
| h | Specific enthalpy; baseline exit area height |
| h* | exit area height with deployed ramp |
| i | Nozzle inlet |
| k | Turbulent kinetic energy |
| $\dot{m}$ | Mass flow rate |
| q | Heat transfer quantity |
| r | Solution residual term in pressure-based solver; ramp; radius |
| s | Strain-rate tensor |
| t | Time; nozzle throat |
| u | Axial velocity; velocity component |
| v | Radial velocity |
| w | Nozzle exit area width |
| x, y | Cartesian coordinates; nozzle coordinates |

TABLE B

Defined Symbols

| Greek Letter | Definition |
| --- | --- |
| α | Geometric ramp angle |
| Δ | Difference of |
| δ | Flow deflection angle; delta function |
| ε | Turbulence dissipation rate |
| γ | Specific heat ratio |
| κ | Thermal conductivity; coefficient |
| λ | Second viscosity coefficient |
| μ | Dynamic viscosity |
| ν | Kinematic viscosity |
| ω | Under-relaxation factor; specific dissipation rate |
| φ | Nozzle exit angle; arbitrary flow parameter |
| ρ | Density |
| τ | Stress tensor |
| θ | Ramp angular position |
| ξ | Local pressure gradient term |

TABLE C

Defined subscripts

| Subscript | Definition |
| --- | --- |
| ∞ | Freestream |
| 0 | Reference |
| abs | Absolute pressure |
| gauge | Gauge pressure |
| i, j, k | Index; component |
| it | Inlet to throat |
| nb | Neighboring cell |
| op | Operating pressure |
| P | Current cell centroid |
| te | Throat to exit |
| t | Total pressure; turbulence |
| w | Wall |

TABLE 1

Resulting Geometrical Parameters For Three Nozzle Coordinates

|  | Inlet | Throat | Exit |
| --- | --- | --- | --- |
| $P_t$ or P [psia] | 38.0 | 20.1 | 14.7 |
| Ma | 0.50 | 1.00 | 1.24 |
| A/A* | 1.34 | 1.00 | 1.04 |
| A[$in^2$] | 193 | 144 | 150 |
| r [in] | 7.84 | 6.77 | 6.90 |

TABLE 2

Special Boundary Conditions Applied To Piecewise Quartic Splines

|  | $S_i(x)$ | $dS_i/dx$ | $d^2S_i/dx^2$ |
| --- | --- | --- | --- |
| Inlet | $S_1 = y_i$ | $S'_1 = 0$ | — |
| Throat | $S_1 = y_t$ | $S'_1 = 0$ | $S''_1 = S''_2$ |
|  | $S_2 = y_t$ | $S'_2 = 0$ |  |
| Exit | $S_2 = y_e$ | $S'_2 = \tan \phi_e$ | $S''_2 = 0$ |

TABLE 1

Differences In The Splines' 1st And 2nd Derivatives

| Inlet | Throat |
| --- | --- |
| $|S'_1| = 0.00049$ | $|S'_1 - S'_2| = 0.00023$ |
| $|S''_1| = 0.06456$ | $|S''_1 - S''_2| = 0.00015$ |

TABLE 4

Mass Flow Data For The Analytical And Numerical Validation Cases

|  | Analytical | Inviscid Fluent Case | % Error |
| --- | --- | --- | --- |
| $\dot{m}$ [lbm/s] | 68.06 | 68.01 | 0.074 |

TABLE 5

Variable Ramp Parameter Values Used

| $L_r$ [in] | θ [°] |
| --- | --- |
| 1.5 | 10 |
| 3.0 | 25 |
| 4.5 | 40 |

TABLE 6

Matrix Containing The Subcase Identifiers

|  | θ | | |
| --- | --- | --- | --- |
| $L_r$ | 10° | 25° | 40° |
| 1.5-in | 1a | 1b | 1c |
| 3.0-in | 2a | 2b | 2c |
| 4.5-in | 3a | 3b | 3c |

TABLE 7

Resulting Values Of Ψ For Each Ramp Configuration

| | θ | | |
|---|---|---|---|
| $L_r$ | 10° | 25° | 40° |
| 1.5-in | 6.6 | 15.0 | 23.5 |
| 3.0-in | 7.7 | 17.9 | 27.4 |
| 4.5-in | 9.6 | 21.8 | 32.1 |

TABLE 8

Chosen Definitions For Particular Flow Properties In ANSYS Fluent

| Property | Value/Condition |
|---|---|
| γ | 1.4 |
| μ | $\mu_0 \left(\frac{T}{T_0}\right)^{1.5} \left(\frac{T_0 + S}{T + S}\right)$ |
| ρ | $\frac{p_{op} + p}{RT}$ |

TABLE 9

Reference Values For The Sutherland Dynamic Viscosity Formula

| $T_0$ [°R] | S [°R] | $\mu_0$ [lbf · s/ft²] |
|---|---|---|
| 492 | 199 | $3.58 \times 10^{-7}$ |

TABLE 10

Chosen Solution Control Parameters For All Subcases

| Parameter | ω |
|---|---|
| ρ | 0.8 |
| k | |
| ε | |
| $\mu_t/\mu$ | |
| Energy | 0.95 |
| Momentum | 0.75 |
| Pressure | |

TABLE 11

Resulting Values From The Series Of Calculations

| Parameter | Non-AB Inlet | AB Inlet |
|---|---|---|
| p [psia] | 32.0 | 28.5 |
| T [°R] | 1,741 | 3,489 |
| ρ [slug/ft³] | 0.0015 | 0.0007 |
| a [ft/s] | 2,045 | 2,896 |
| v [ft/s] | 1,023 | 1,448 |
| $\mu_{avg}$ [lbf · s/ft²] | $8.583 \times 10^{-7}$ | $1.339 \times 10^{-6}$ |
| $Re_D$ | 2,402,729 | 967,281 |
| I [%] | 2.55 | 2.86 |
| $\Delta Y_{wall}$ [in] | $5.0 \times 10^{-4}$ | 0.0012 |

TABLE 12

Final Grid Size For Each TVC Subcase

| | θ | | |
|---|---|---|---|
| $L_r$ | 10° | 25° | 40° |
| 1.5-in | 168,000 | 178,000 | 199,000 |
| 3.0-in | 173,000 | 184,000 | 204,000 |
| 4.5-in | 178,000 | 190,000 | 209,000 |

TABLE 13

Inlet And Outlet Boundary Parameters.

| | Non-afterburner Conditions (1) | Afterburner Conditions (2) |
|---|---|---|
| Pressure Inlet | | |
| $P_t$ [lbf · in²] | 38 | 33.8 |
| $P_{guess}$ [lbf · in²] | 32 | 29 |
| $T_t$ [° F.] | 1,368 | 3,204 |
| I [%] | 2.55 | 2.86 |
| Pressure Outlet | | |
| $P_{gauge}$ [lbf · in²] | 14.7 | |
| Backflow $T_t$ [° F.] | 60 | |
| I [%] | 5 | |

TABLE 14

Mean Flow Deflection Angle Values From The Exit Plane

| | Inlet Case # | | | | | |
|---|---|---|---|---|---|---|
| | 1 | | | 2 | | |
| | θ | | | | | |
| $L_r$ | 10° | 25° | 40° | 10° | 25° | 40° |
| 1.5-in | -4.4 | -13.2 | -20.6 | -3.5 | -12.3 | -18.9 |
| 3.0-in | -7.3 | -18.9 | -26.3 | -8.0 | -17.3 | -24.5 |
| 4.5-in | -11.5 | -21.6 | -30.6 | -9.9 | -20.0 | -29.2 |

What is claimed is:

1. An apparatus for vectoring thrust of an air-breathing engine comprising:
 a Venturi nozzle having:
  a converging section,
  a throat,
  a diverging section, and
  an exit, arranged in series along a centerline of the Venturi nozzle from upstream to downstream, wherein a downstream end of the converging section ends at the throat and the diverging section diverges from the throat to the exit;
 a first deployable ramp fixed to the nozzle at the throat; and
 a single second deployable ramp fixed to the nozzle at the exit;
 wherein:
  the second deployable ramp is circumferentially arranged opposite the first deployable ramp;
  a downstream terminus of the first deployable ramp is always upstream of the exit;
  the first deployable ramp and the second deployable ramp each have a deployed state and an undeployed state;

the second deployable ramp extends downstream of the exit in the deployed state;

in the undeployed states of the first deployable ramp and the second deployable ramp, an exhaust flow is along the centerline; and in the deployed states of the first deployable ramp and the second deployable ramp, the exhaust flow is deflected toward the centerline by the first deployable ramp and thereafter deflected by the second deployable ramp to thereby vector a thrust resulting from the exhaust flow off of the centerline.

2. The apparatus of claim 1, wherein the first deployable ramp and the second deployable ramp are asymmetrically staggered.

3. The apparatus of claim 1, wherein the air-breathing engine comprises a supersonic engine.

4. The apparatus of claim 1, wherein:
the exhaust flow is axial when the first deployable ramp and the second deployable ramp are in the undeployed state; and
the exhaust flow is redirected to a non-axial condition when the first deployable ramp and the second deployable ramp are in the deployed state.

5. The apparatus of claim 4, wherein:
the Venturi nozzle comprises a nozzle axis and the exhaust flow comprises a sonic line; and
the sonic line is skewed off-axis with the nozzle axis to vector thrust from the air-breathing engine when the first deployable ramp and/or the second deployable ramp are deployed.

6. The apparatus of claim 5, wherein:
the first deployable ramp is configured to separate axial flow entering from the inlet; and
the second deployable ramp is configured to direct reattaching airflow at the exit to an off-axis condition.

7. The apparatus of claim 4, wherein at least one of the first deployable ramp and the second deployable ramp comprises a flap pivoting about a hinge from the undeployed state to the deployed state.

8. A thrust-vectored, air-breathing engine, comprising:
a Venturi nozzle having an inlet, an exit, and a throat disposed between the inlet and the exit, wherein the nozzle converges from the inlet to the throat and diverges from the throat to the exit;
a first deployable ramp fixed to the nozzle at the throat; and
a second deployable ramp fixed to the nozzle at the exit, opposite to and downstream of the first deployable ramp;
wherein:
a downstream terminus of the first deployable ramp is always upstream of the exit;
the first deployable ramp and the second deployable ramp each have a deployed state and an undeployed state;
the second deployable ramp extends downstream of the exit in the deployed state;
in the undeployed states of the first deployable ramp and the second deployable ramp, an exhaust flow is along the centerline; and
in the deployed states of the first deployable ramp and the second deployable ramp, the exhaust flow is deflected toward the centerline by the first deployable ramp and thereafter deflected by the second deployable ramp to thereby vector a thrust resulting from the exhaust flow off of the centerline.

9. The engine of claim 8, wherein the first deployable ramp and the second deployable ramp are asymmetrically staggered.

10. The engine of claim 8, wherein the thrust-vectored, air-breathing engine comprises a supersonic engine.

11. The engine of claim 8, wherein:
the exhaust flow is axial when the first deployable ramp and the second deployable ramp are in the undeployed state; and
the exhaust flow is redirected to a non-axial condition when the first deployable ramp and the second deployable ramp are in the deployed state.

12. The engine of claim 11, wherein:
the Venturi nozzle comprises a nozzle axis and the exhaust flow comprises a sonic line; and
the sonic line is skewed off-axis with the nozzle axis to vector thrust from the thrust-vectored, air-breathing engine when the first deployable ramp and/or the second deployable ramp are deployed.

13. The engine of claim 12, wherein:
the first deployable ramp is configured to separate axial flow entering from the inlet; and
the second deployable ramp is configured to direct reattaching airflow at the exit to an off-axis condition.

14. The engine of claim 11, wherein at least one of the first deployable ramp and the second deployable ramp comprises a flap pivoting about a hinge from the undeployed state to the deployed state.

15. A method for vectoring thrust of an air-breathing engine comprising a Venturi nozzle having:
a converging section,
a throat,
a diverging section, and
an exit, arranged in series along a centerline of the Venturi nozzle from upstream to downstream, wherein a downstream end of the converging section ends at the throat and the diverging section diverges from the throat to the exit;
the method comprising:
deploying first and second deployable ramps within the Venturi nozzle; and
redirecting an exhaust flow of the Venturi nozzle;
wherein:
the second deployable ramp is circumferentially arranged opposite the first deployable ramp;
a downstream terminus of the first deployable ramp is always upstream of the exit;
the first deployable ramp and the second deployable ramp each have a deployed state and an undeployed state;
the second deployable ramp extends downstream of the exit in the deployed state;
in the undeployed states of the first deployable ramp and the second deployable ramp, an exhaust flow is along the centerline; and
in the deployed states of the first deployable ramp and the second deployable ramp, the exhaust flow is deflected toward the centerline by the first deployable ramp and thereafter deflected by the second deployable ramp to thereby vector a thrust resulting from the exhaust flow off of the centerline.

16. The method of claim 15, wherein the first and second deployable ramps are asymmetrically staggered.

17. The method of claim 15, wherein the air-breathing engine comprises a supersonic engine.

18. The method of claim 15, wherein:
the exhaust flow is axial when the first and second deployable ramps are in the undeployed state; and
redirecting the exhaust flow comprises directing the exhaust flow to a non-axial condition by activating the first and second deployable ramps to the deployed state.

19. The method of claim 18, wherein:
the Venturi nozzle comprises a nozzle axis and the exhaust flow comprises a sonic line; and
redirecting the exhaust flow comprises skewing the sonic line off-axis with the nozzle axis to vector thrust from the air-breathing engine.

20. The method of claim 19, wherein:
deploying the first and second deployable ramps comprises deploying the first deployable ramp to separate axial flow entering from the inlet and deploying the second deployable ramp to direct re-attaching airflow at the exit to an off-axis condition.

21. The method of claim 18, wherein at least one of the first and second deployable ramps comprises a flap pivoting about a hinge from the undeployed state to the deployed state.

\* \* \* \* \*